(12) United States Patent
Altes

(10) Patent No.: US 7,701,380 B2
(45) Date of Patent: Apr. 20, 2010

(54) BEAM PHASE MODULATION FOR IMPROVED SYNTHETIC APERTURE DETECTION AND ESTIMATION

(75) Inventor: Richard Alan Altes, La Jolla, CA (US)

(73) Assignee: Chirp Corporation, La Jolla, CA (US)

( * ) Notice: Subject to any disclaimer, the term of this patent is extended or adjusted under 35 U.S.C. 154(b) by 274 days.

(21) Appl. No.: 11/714,797

(22) Filed: Mar. 7, 2007

(65) Prior Publication Data

US 2009/0066562 A1 Mar. 12, 2009

(51) Int. Cl.
*G01S 13/90* (2006.01)
(52) U.S. Cl. ..................................... 342/25 F
(58) Field of Classification Search ................. 342/25 F
See application file for complete search history.

(56) References Cited

U.S. PATENT DOCUMENTS

| 4,978,961 | A |   | 12/1990 | Williams |   |
|---|---|---|---|---|---|
| 5,179,383 | A | * | 1/1993 | Raney et al. | 342/25 D |
| 5,245,347 | A | * | 9/1993 | Bonta et al. | 342/149 |
| 5,489,907 | A |   | 2/1996 | Zink |   |
| 6,088,295 | A | * | 7/2000 | Altes | 342/25 A |
| 2009/0066562 | A1 | * | 3/2009 | Altes | 342/25 F |

FOREIGN PATENT DOCUMENTS

| EP | 0989416 | 3/2000 |
| WO | 2005073753 | 8/2005 |

OTHER PUBLICATIONS

European Search Report, dated Jul. 23, 2007.

* cited by examiner

*Primary Examiner*—Dan Pihulic
(74) *Attorney, Agent, or Firm*—Dalina Law Group, P.C.

(57) ABSTRACT

Phase modulated beam patterns are substituted for the constant-phase versions that have been used in prior synthetic aperture systems. Relative movement between a radar/sonar/ultrasound platform and a point target causes a sequence of echoes from the point target to be phase and amplitude modulated by the beam pattern, as well as by the usual quadratic phase variation caused by range changes. Azimuth, range rate, and azimuth rate estimation, as well as detection in clutter, are substantially improved by appropriate beam pattern phase modulation, which is applied to the transmitter and/or receiver beam patterns. Phase modulated beam patterns are synthesized with array element weighting functions that are designed for high ambiguity function peak-to-sidelobe level, reduction of unwanted ambiguity ridge lines, and adequate spatial sampling. Two dimensional beam pattern phase modulation is useful when the relative motion between a transmit-receive array and multiple targets has both azimuth and elevation components.

5 Claims, 17 Drawing Sheets

BEAM PHASE MODULATION FOR IMPROVED SYNTHETIC APERTURE DETECTION AND ESTIMATION

STATEMENT REGARDING FEDERALLY SPONSORED RESEARCH OR DEVELOPMENT

Research for this invention was supported by the U.S. Government via STTR Phase II Contract N68335-06-C-0044. The patent rights clause in that contract is Federal Acquisition Regulation (FAR) clause 52.227-11, "Patent Rights—Retention by the Contractor (Short Form)." This clause states that the contractor (Chirp Corporation, which employs the inventor) may retain the entire right, title, and interest throughout the world to each subject invention. However, the Federal Government shall have a nonexclusive, nontransferable, irrevocable, paid-up license to practice or have practiced for or on behalf of the United States the subject invention throughout the world.

CROSS-REFERENCE TO RELATED APPLICATIONS

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The purpose of the invention is to improve stripmap synthetic aperture radar/sonar (SAR/SAS) and inverse synthetic aperture radar/sonar/ultrasound (ISAR/ISAS) via better clutter rejection, velocity parameter estimation (range rate and azimuth rate), and azimuth position estimation. The invention also is applicable to target movement in three dimensions relative to a radar/sonar/ultrasound array. In this case, the invention improves estimates of range rate, azimuth rate, elevation rate, azimuth position, and elevation position. Applications are to maritime and ground surveillance SAR containing moving objects, missile defense radar (ISAR), sonar mine hunting (SAS), and noninvasive Doppler ultrasound (ISAS) for fluid velocity measurement in two dimensions (parallel and perpendicular to the vessel).

In synthetic aperture processors, echoes are coherently pulse compressed (replica correlated or matched filtered) on reception and used to form in-phase and quadrature components. These components specify the magnitude and phase of a complex-valued echo range sample. A sequence of such components from multiple signal-echo pairs comprise a phase history corresponding to the range variation (measured in wavelengths) associated with relative motion between the radar/sonar platform and each point target.

If point targets at different azimuth locations do not move except for relative platform motion, then their phase histories are azimuth-displaced versions of a predictable phase history, and they can be separated by azimuth compression if the phase history bandwidth B is sufficiently large (C. E. Cook and M. Bernfeld, *Radar Signals*, Academic Press, New York, 1967). If various point targets have different range rates, however, they may not be separable even if B is large. This lack of resolution can occur if range rate and azimuth displacement can compensate for one another. For example, range rate causes a displacement in frequency. If a phase history lies on a long tilted line in the time-frequency plane, a frequency displacement can be compensated by a time shift. A phase history time shift is equivalent to an azimuth shift. A tilted line in the time-frequency plane corresponds to linear frequency modulation (linear FM) and quadratic phase modulation. Quadratically phase modulated (linear FM) phase histories experience degraded range-rate/azimuth resolution with ambiguous receiver outputs, such that objects with nonzero range rate appear at the wrong azimuth.

Azimuth compression often utilizes frequency domain matched filtering to correlate the data phase history with reference phase histories. An unknown range rate causes a Doppler shift, which can be hypothesized by a frequency domain shift of a predicted (reference) phase history. Predicted phase histories are correlated with the data phase history for estimation/detection. Range rate estimation accuracy and resolution capability is proportional to the duration T of the phase histories in the absence of ambiguities and error coupling, such as those that occur with linear FM (Cook and Bernfeld, op. cit.).

Azimuth rate in the direction of assumed relative platform motion increases the rate at which the beam pattern sweeps across a target, and causes time compression of phase histories; azimuth rate in the opposite direction causes time dilation. Time scaling (compression/dilation) can be included as an additional parameter hypothesis in the azimuth compression process. The effect of nonzero range rate on a wideband radar/sonar waveform also is represented by time scaling. Estimation accuracy of compression/dilation increases with waveform time-bandwidth product (R. A. Altes and E. L. Titlebaum, "Bat signals as optimally Doppler tolerant waveforms," *J. Acous. Soc. Am.* Vol. 48, 1970, pp. 1014-1020). Azimuth rate estimation accuracy thus is proportional to the time-bandwidth product (TB) of the phase histories, unless ambiguity effects limit estimation and resolution capability.

For the smooth, low time-bandwidth product beam patterns that comprise prior art, the phase history caused by relative target/platform motion in broadside stripmap SAR is closely approximated by a quadratic phase function, corresponding to linear FM. The azimuth compression process is then subject to the well known range-Doppler error coupling phenomenon for linear FM, such that the receiver response to ambiguous pairs of erroneous azimuth displacements and range rates is nearly as large as the receiver response to the correctly hypothesized azimuth and range rate. This error coupling is manifested as a ridge in the phase history azimuth/range-rate ambiguity function, and it severely degrades estimation/detection performance in a cluttered environment relative to a receiver with an ideal (thumbtack) ambiguity function. Linear FM also is relatively insensitive to azimuth rate (compression/dilation), compared to other waveforms or phase histories with the same TB product (R. A. Altes, "Optimum waveforms for sonar velocity discrimination," *Proc. of the IEEE* vol. 39, 1971, pp. 1615-1617).

In the absence of error coupling, azimuth resolution improves as SAR/SAS beam width is increased, since phase history bandwidth is increased. Increased beam width also increases the phase history time-bandwidth product, resulting in improved azimuth rate resolution. Increased beam width and phase history duration, however, cause extension of the tilted line representation of linear FM in the time-frequency plane, with consequent extension and flattening of the linear FM ambiguity function ridge line. These effects signify an increase in the effect of unknown range rate on azimuth estimation error. A trade-off thus occurs, such that beam widening improves azimuth rate estimation but degrades azimuth and range rate estimation because of linear FM error coupling. Target detection in Doppler-distributed clutter also tends to be degraded when the FM ridge line is extended via beam widening. Synthetic aperture processors that use beams with no phase modulation are geometrically constrained to operate with quadratic phase histories (linear FM) for azimuth compression, despite the drawbacks and trade-offs associated with such modulation. This constrained operation constitutes the prior art.

The invention is to replace a conventional beam pattern (without nonlinear phase modulation) with a beam pattern that has nonlinear phase modulation or phase coding. Such a beam pattern is obtained by phase modulating the aperture shading function, which broadens the beam as well as imparting the desired phase modulation to the beam pattern. As the beam is swept past a point target in a SAR/SAS application (or a point target moves through the beam in ISAR/ISAS), beam coding/modulation adds beam-induced phase variation to the quadratic phase that is associated with range variation. The added beam-induced phase is controlled by the system designer rather than by geometry.

An appropriate beam phase modulation function removes the constraints that have been imposed by linear FM phase histories. In a broadside stripmap SAR, appropriate beam phase modulation dramatically reduces range-rate/azimuth coupling error, greatly improves resolution and detection/ estimation performance in clutter, significantly reduces estimation errors for joint estimation of azimuth, range rate, and azimuth rate, and eliminates the trade-offs associated with conventional SAR beam width variation when phase histories have quadratic phase variation. For three dimensional operation, similar advantages apply to estimates of azimuth, elevation, azimuth rate, elevation rate, and range rate, provided that a two dimensional beam pattern is coded/modulated in azimuth and elevation so as to reduce ambiguities.

Applications include discrimination of small objects from sea clutter in maritime stripmap SAR and discrimination of moving vehicles from stationary roadside objects in ground mapping stripmap SAR. Comparison of SAR ground maps obtained at two different times can be used to identify new roadside objects. The invention enables accurate, noninvasive ISAS measurement of range, azimuth, range rate, and azimuth rate, thus creating informative representations of fluid flow parallel and orthogonal to a vessel's length, as a function of distance from the vessel wall.

BRIEF SUMMARY OF THE INVENTION

The invention improves synthetic aperture performance by appropriate nonlinear phase modulation or phase coding of the beam patterns that are used for transmission and/or reception. Beam pattern phase modulation is accomplished by nonlinear phase modulation of the shading (element weighting) function in a phased array. Prior art uses a smooth, symmetric array shading function with no phase modulation aside from element phase shifts that are applied for beam steering. The invention can use a conventional shading function (as in prior art) as the magnitude of a complex-valued array weighting function that incorporates nonlinear phase modulation.

Nonlinear phase modulation broadens the beam, but does not necessarily reduce the ratio of peak beam amplitude to the largest grating lobe in the broadened beam pattern. In fact, an appropriate phase modulation function causes a significant increase in the beam peak-to-sidelobe ratio defined by the largest beam pattern amplitude divided by the maximum grating lobe amplitude. The energy within the main lobe of the beam divided by the total beam energy is unaffected by appropriate nonlinear phase modulation. This energy ratio is relevant to SAR performance (R. O. Harger, *Synthetic Aperture Radar Systems*, Academic Press, New York, 1970).

Relative motion of platform and target causes the beam pattern to be swept across the target. The amplitude variation of the resulting phase history function is determined by the beam pattern magnitude. For a broadside beam with no phase modulation (prior art), the phase variation of the phase history function depends strictly on range changes (measured in wavelengths) over multiple pulse-echo pairs. For broadside stripmap SAR (and Doppler ultrasound ISAS with the beam orthogonal to the direction of fluid motion), the phase histories exhibit quadratic phase modulation or linear frequency modulation (linear FM). Linear FM is associated with undesirable range-rate/azimuth ambiguities. Azimuth rate measurements also are relatively inaccurate.

For a broadside beam with nonlinear phase coding/modulation, relative motion of platform and target again causes the beam to be swept across the target, but the phase history depends upon amplitude and phase variations of the beam pattern as well as upon range changes. Beam pattern phase variation can be designed to suppress undesirable ambiguities, improve the accuracy of range rate and azimuth rate measurements, and improve signal-to-clutter ratio. All the advantages of azimuth phase history compression are retained, provided that appropriate reference functions are used in the receiver.

Aside from ambiguity suppression, another advantage of beam coding/modulation is that a comparatively large phased array antenna can be used to produce a wide beam pattern by phase modulating the array element weighting (shading) function. For targets with known range rate, wide synthetic aperture beam patterns are desirable for broadside stripmaps (and for ISAS with a beam that is orthogonal to the motion vector of the target environment) because the duration, bandwidth, and time-bandwidth product of an observed phase history is increased, yielding better resolution in azimuth, range rate, and azimuth rate. For targets/clutter with unknown range rates and with no beam phase modulation, beam widening is counterproductive because the ridge length of the linear FM azimuth/range-rate ambiguity function is increased, signifying worse azimuth/range-rate estimation performance than with a narrow beam. This problem is avoided by using appropriate beam phase modulation. Appropriate phase modulation/coding of a phased array shading function reduces the error of azimuth, range rate, and azimuth rate estimates by beam widening as well as by ambiguity suppression.

An alternative method for widening the beam pattern is to reduce aperture/array size in the direction of relative motion between the array and the target environment. Array size reduction, however, reduces the efficiency of a given phased array, and linear FM phase histories with their undesirable ambiguities are still present because no phase modulation is imposed by the beam pattern. For a large phased array, another alternative is to use a narrow spotlight (without nonlinear beam phase modulation), and to observe the same area over multiple pulse-echo pairs via beam steering (W. G. Carrara, R. S. Goodman, and R. M. Majewski, *Spotlight Synthetic Aperture Radar*, Artech House, Norwood, Mass., 1995). Beam coding/modulation, however, provides greater area coverage rate than a spotlight, while suppressing azimuth/range-rate ambiguities.

For range-azimuth mapping in broadside stripmap SAR, nonlinear phase modulation is applied to a phased array element weighting (aperture shading) function in the azimuth direction. This modulation affects the azimuth width and phase variation of the beam pattern, but does not necessarily affect elevation variation. For three dimensional mapping (e.g., for ISAR monitoring of multiple targets with different cross-range trajectories), nonlinear phase modulation is applied to the phased array in two dimensions to induce different azimuth and elevation dependent phase variations of the beam pattern. The azimuth and elevation phase modulation functions are designed to reduce ambiguities (error coupling) between estimates of azimuth rate, elevation rate, range rate, azimuth position, and elevation position.

DETAILED DESCRIPTION OF THE INVENTION

The invention is to replace beam patterns with no phase variation in synthetic aperture systems (prior art) with beam patterns that have appropriate nonlinear phase modulation (or phase coding). Appropriate phase modulation/coding improves estimation/detection performance for broadside stripmap synthetic aperture radar (SAR) and for other synthetic aperture processors (squint stripmap SAR, SAS, ISAR, and ISAS). The ISAS application includes coherent processing of multiple echoes in Doppler ultrasound. Phase modulated beam patterns can provide significant improvements in estimation/detection performance, as expressed by ambiguity function properties, lower bounds on estimation errors, and signal-to-clutter ratio.

Appropriate phase coding/modulation of the combined transmit-receive beam pattern is accomplished by coding/modulation of the phase of an array shading (element weighting) function for transmit and/or receive arrays. For situations where the motion between the target environment and the array platform involves significant changes in elevation as well as azimuth, beam pattern phase variations are applied in both azimuth and elevation, and are chosen to reduce confusion between estimates of azimuth, elevation, azimuth rate, elevation rate, and range rate.

Figure 1:
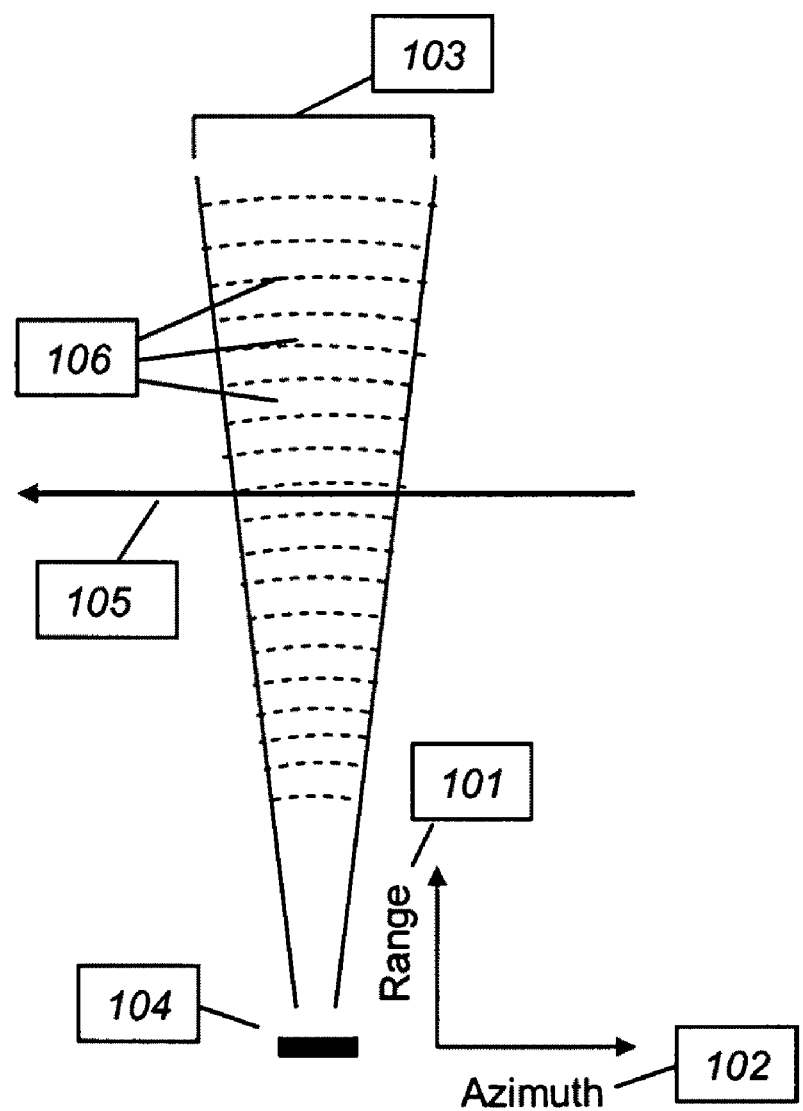
FIG. 1 is a schematic illustration of the movement of a point target through anin phase changes are caused by crossing constant-range contours that correspond to unmodulated beam of a synthetic aperture or inverse synthetic aperture system, where constant-phase contours.

Phase histories are formed from in-phase and quadrature (I,Q) samples at the output of a coherent signal-echo correlator or matched filter for each echo in a sequence of pulse-echo pairs. FIG. 1 illustrates the geometry for a broadside stripmap SAR. Phase histories are functions of range 101 and azimuth 102, and the azimuth variation is of interest here. For an unmodulated beam pattern 103 transmitted from an array on platform 104, phase variation of an azimuth-dependent target phase history is associated with pulse-to-pulse range variation of the target relative to the platform, which is caused by target motion along the path 105 and is illustrated by crossing of constant-range contours 106. Constant range contours also can be interpreted as constant-phase contours when the range is measured in wavelengths.

Figure 2:
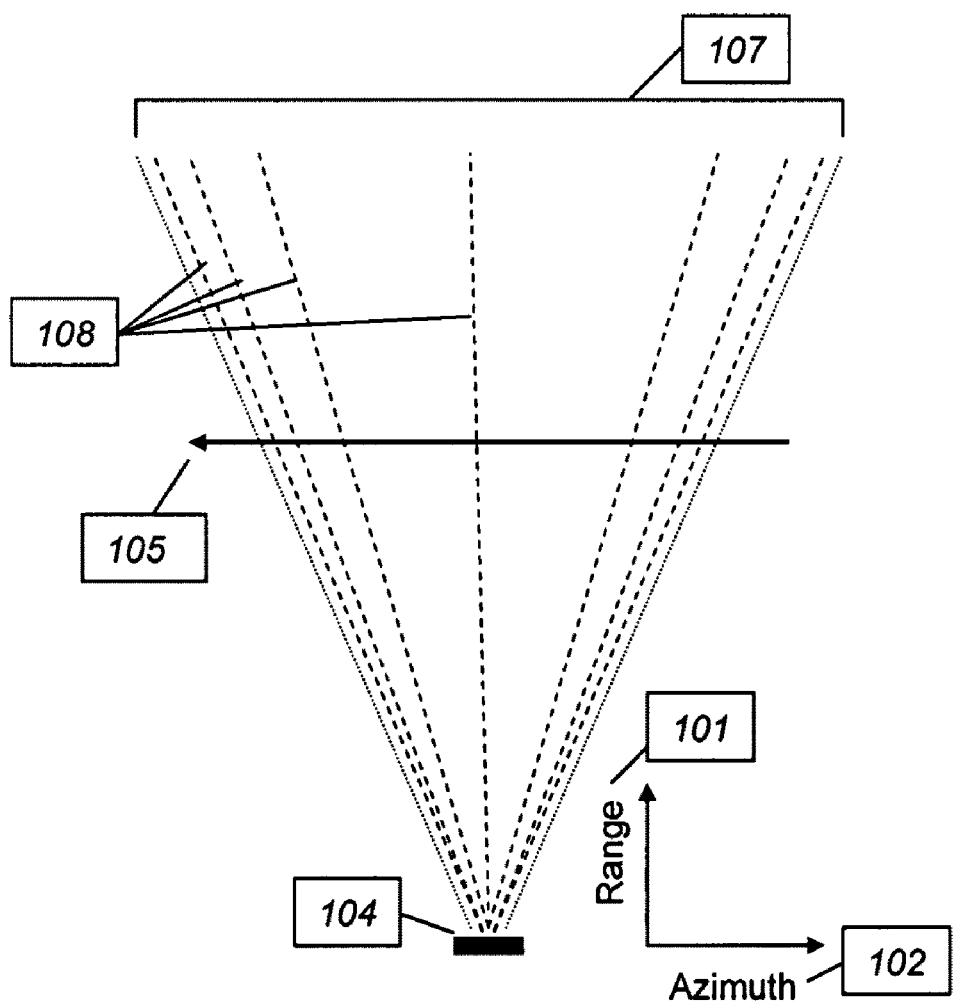
FIG. 2 is a schematic illustration of the movement of a point target through a phase modulated beam of a synthetic aperture or inverse synthetic aperture system, wherein phase changes are caused by crossing constant-phase contours within the beam pattern as well as the constant-range contours in FIG. 1.

FIG. 2 illustrates the effect of applying phase coding or nonlinear phase modulation to the array shading function and thus to the beam pattern. The phase modulated beam pattern 107 is broadened relative to the unmodulated beam pattern 103. Motion of the beam across a point target as in SAR/SAS (or motion of the target across the beam as in ISAR/ISAS) results in relative movement of a target along path 105. This motion causes the target to cross constant-phase contours 108 of the beam pattern, and such crossings are associated with beam-induced phase modulation of the target phase history. This beam-induced phase variation is added to the range-induced phase variation illustrated in FIG. 1.

For suitable beam coding/modulation, the receiver becomes much less ambiguous with respect to joint range rate and azimuth estimates, and much more sensitive to azimuth rate. Because of this increased sensitivity, the receiver must generate extra range rate and azimuth rate parameter hypotheses in order to assure that all possible targets can be detected. The payoff is better resolution of desired objects from clutter (with correspondingly better detection performance) and more accurate estimation of position and velocity parameters.

For appropriate beam phase coding in elevation as well as azimuth, accurate simultaneous estimation of range, range rate, azimuth, azimuth rate, elevation, and elevation rate becomes possible. Beam coding in elevation generally is not applicable to broadside stripmap SAR, but is important for applications in which targets can move in elevation as well as azimuth relative to the radar/sonar platform.

For nonzero azimuth rate (target motion parallel to the path 105 in FIGS. 1 and 2), the rate at which the point target moves across the beam is changed. This change dilates or compresses the phase histories contributed by both range change (FIG. 1) and beam phase modulation (FIG. 2). For nonzero range rate, the point target has a velocity component that is orthogonal to the path 105 in FIGS. 1 and 2. This component causes a frequency shift of the phase history function that is measured at zero range rate, and is associated with crossing the constant phase contours 106 in FIG. 1 by moving in the range direction 101. The range rate velocity component also may affect the phase history function by crossing constant-phase contours 108 of the beam pattern 106 in FIG. 2, by moving orthogonal to the path 105. At long ranges, however, this effect usually is negligible.

For estimation of azimuth (phase history time shift), lower bounds on resolution bin size and the standard deviation of the time shift estimate are inversely proportional to the bandwidth of the observed phase history. For range rate (phase history frequency shift) estimation, lower bounds on resolution bin size and the standard deviation of the frequency shift estimate are inversely proportional to phase history time width (duration). For cross range rate (compression/dilation) estimation, the lower bounds are inversely proportional to the time-bandwidth product of the observed phase history (Cook and Bernfeld, op. cit.; Altes and Titlebaum, op. cit.; Altes, op. cit.).

Nonlinear phase modulation of an array shading function broadens the beam width, and a point target that moves across the beam along path 105 in FIG. 2 has a phase history with larger time width than in the absence of the modulation (FIG. 1). The range-induced phase modulation (FIG. 1) and the beam pattern phase variation (FIG. 2) increase the bandwidth of the time-extended phase history. The time-bandwidth product is further increased by an appropriate choice of the nonlinear phase modulation or coding that is applied to the array shading function. An appropriate array weighting function has half-wave, cosine-squared amplitude and phase functions, i.e., a Hann array shading function (H. L. Van Trees, *Optimum Array Processing*, Wiley, New York, 2002) with nonlinear phase modulation that is also proportional to a Hann function. This array weighting function results in a combined transmit-receive beam pattern with rapid, high-amplitude variation near the beam edges. For a given beam width, this type of variation yields phase histories with relatively large time-bandwidth product.

For a given complex beam pattern, broadside stripmap phase histories can be predicted from hypothesized azimuth, azimuth-rate, range, and range-rate parameters. These predictions can be tested with an estimation/detection process that correlates predicted (reference) phase histories with the data phase history. For multiple point targets at different azimuths, the correlation process is conveniently implemented with a frequency domain matched filter: The Fourier transform of the data phase history is multiplied by the conjugate of the Fourier transform of the hypothesized phase history, and the resulting product is inverse Fourier transformed.

The receiver response to hypothesized azimuth, azimuth-rate, and range-rate parameters can be represented by a generalized ambiguity function that depends on the three parameters. The central peak amplitude of the ambiguity function represents the receiver response corresponding to correct parameter hypotheses. Other ambiguity function samples correspond to various combinations of the hypothesized parameters. Sidelobes are local ambiguity function maxima that are not at the central peak. A ridge sometimes is formed by a set of ambiguous parameter combinations that lie on a line through the peak. For energy normalized phase histories, an ideal ambiguity function has unit amplitude at the central peak and low amplitude elsewhere (low sidelobe and ridge levels).

Hann function (half-wave, cosine-squared) phase modulation of an array shading function with Hann function amplitude imparts high time-bandwidth product phase histories to point targets in broadside stripmap SAR. These phase histories result in a sharp central peak and uniformly low sidelobe levels of the azimuth/range-rate/azimuth-rate ambiguity function, relative to no phase modulation and to other phase modulation functions that have been applied to the Hann array shading function. For example, a Hann shading function magnitude that is modulated by a hat function phase variation (linear decrease in phase from the array center to the edges) is unacceptable because the center of the resulting beam pattern is completely suppressed, yielding poor ambiguity properties despite a large time-bandwidth product. Conversely, Hann shading function magnitude that is phase modulated by a parabolic phase function (quadratic decrease in phase from the array center to the edges) is unacceptable because the beam pattern center is accentuated; the beam edges are attenuated by a smooth, Gaussian-shaped function that reduces the time-bandwidth product of phase histories and provides relatively poor ridge suppression of the ambiguity function in the azimuth/range-rate plane.

Figure 3:
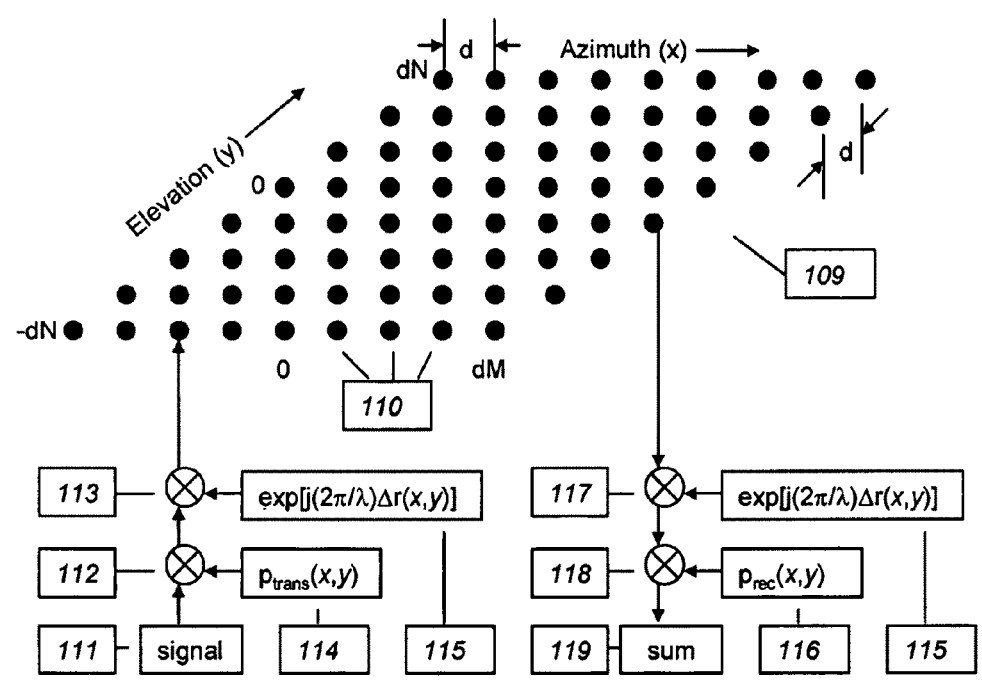
FIG. 3 is a schematic illustration of the application of a complex-valued array weighting (shading) function to elements of phased array during transmission and reception.

Relevant ambiguity functions correspond to combined transmit-received beam patterns. The transmission beam pattern (radiation pattern) is obtained by applying samples of the complex-valued weighting (shading) function $p_{trans}(x,y)$ to the transmitter phased array elements, along with phase shifts for beam steering. This complex weighting process is illustrated in FIG. 3. FIG. 3 shows a rectangular phased array 109 consisting of elements 110 that are separated in azimuth and elevation by d meters, where d is usually equal to one-half of the wavelength λ at the center frequency of the transmitted signal 111. During transmission, the signal 111 (which is the same at each element) is weighted by a complex shading function and phase shifted for beam steering. The shading and beam steering operations both depend on the element location $x=x_m$, $y=y_n$, which is measured relative to the center of the array; $x=y=0$ at the array center.

During transmission, the shading and beam steering operations at each element are implemented by two multiplications, performed respectively by multipliers 112 and 113 in FIG. 3. The signal 111 is first multiplied by a complex shading weight $p_{trans}(x_m,y_n)$ 114. The resulting product is then phase shifted for beam steering via multiplication by the complex factor $\exp[j(2\pi/\lambda)\Delta r(x_m,y_n)]$ 115. The beam steering factor 115 depends on $\Delta r(x_m,y_n)$, which is the distance from the element at $x_m$, $y_n$ to the focus point minus the distance from the center element of the array to the focus point. For a non-homogeneous propagation medium, the beam steering factor 115 must be corrected for ideal focusing. The beam steering factor 115 is considered to be prior art; the invention pertains to the magnitude and phase of the complex-valued shading functions $p_{trans}(x_m,y_n)$ 114 and $p_{rec}(x_m,y_n)$ 116.

During reception, the beam steering and shading operations at each element are again represented by two multiplications, performed respectively with two multipliers 117 and 118 in FIG. 3. Assuming that the array look direction is the same for transmission and reception, the first multiplication operation corresponds to the beam steering factor $\exp[j(2\pi/\lambda)\Delta r(x_m,y_n)]$ 115, and the second multiplication implements complex weighting with $p_{rec}(x_m,y_n)$ 116. The receiver combines all the phase shifted, shaded element outputs with the summing operation 119.

Figure 4:
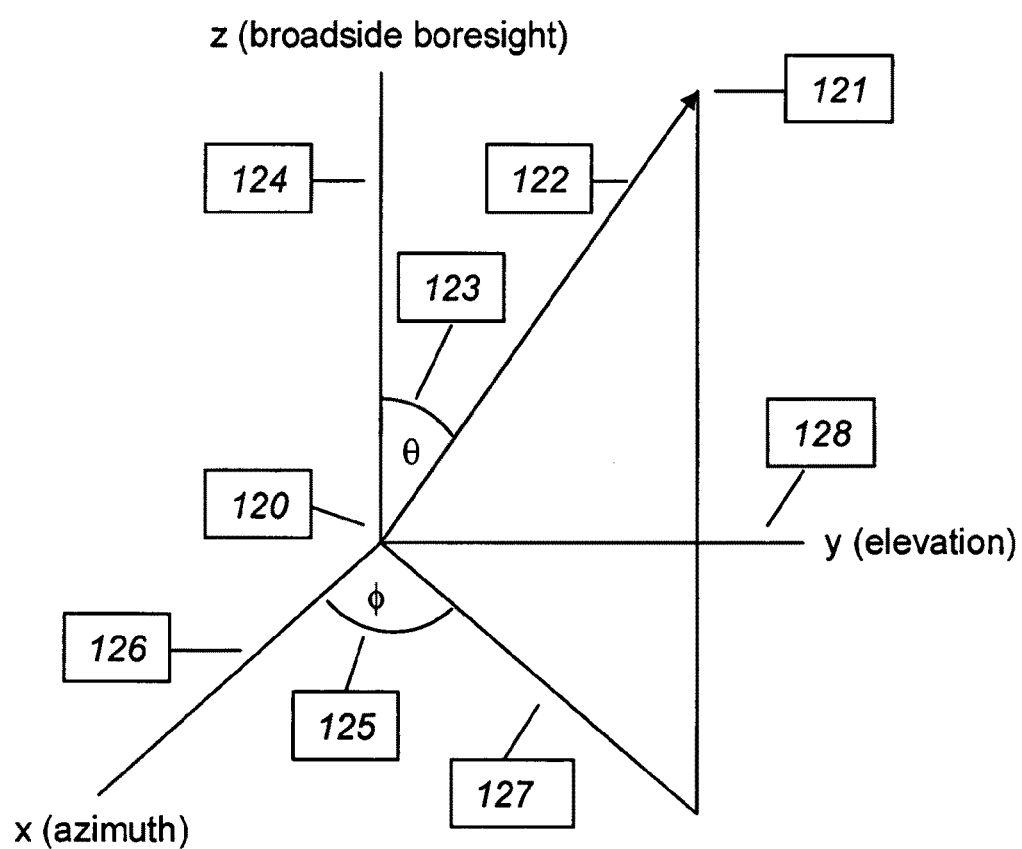
FIG. 4 is schematic diagram of the spherical coordinates that are used to describe a beam pattern.

FIG. 4 shows the spherical coordinates that are used to describe the beam pattern generated by the phased array in FIG. 3. The origin 120 of the coordinate system is at the center of the phased array 109 in FIG. 3. The location 121 of a point on a sphere with radius $r_0$ is specified by: (1) The length $r_0$ of a vector 122 drawn between the origin 120 and the point location 121, (2) the angle θ 123 between the vector 122 and the z axis 124, where the z axis 124 corresponds to the boresight or focus direction for broadside stripmap SAR, and (3) the angle φ 125 between the azimuth (x) axis 126 and the projection 127 of the vector 122 onto the x,y plane. The azimuth dependent behavior of the combined transmit-receive beam pattern can be represented by the beam pattern as a function of θ 122 with φ 125 equal to zero. The elevation dependent behavior can be represented by the beam pattern as a function of θ 122 with φ 125 equal to π/2, i.e., in the plane defined by the z (boresight) axis 124 and the elevation axis 128.

For a planar array with element m,n located at $x_m,y_n$, the complex-valued radiation pattern at a point on a sphere of radius $r_0$ with the center point of the sphere at the array center is $$P_{trans}(\theta, \phi) = \sum_{m,n} p_{trans}(x_m, y_n)\exp[j(2\pi/\lambda)\Delta r(x_m, y_n)] \quad (1)$$

where θ and φ are shown in FIG. 4, and $$\Delta r(x_m,y_n)=[(x_m-x_0)^2+(y_n-y_0)^2+z_0^2]^{1/2}-r_0 \quad (2)$$

For the coordinate system in FIG. 4, $$x_0=r_0 \sin\theta \cos\phi, y_0=r_0 \sin\theta \sin\phi, z_0=r_0 \cos\theta. \quad (3)$$

The transmission array weighting function $p_{trans}(x_m,y_n)$ in Equation (1) is denoted by 114 in FIG. 3.

If the same array weighting function and steering vector are applied during both transmission and reception, then $$p_{rec}(x,y)=p_{trans}(x,y) \quad (4)$$

where $p_{rec}(x,y)$ is denoted by 116 in FIG. 3. In this case, the combined complex-valued transmit/receive beam pattern $P_{TR}(\theta,\phi)$ is the square of the radiation pattern:

$$P_{TR}(\theta,\phi)=[P_{trans}(\theta,\phi)]^2. \quad (5)$$

When Equation (4) is true, the transmit/receive beam pattern is obtained from the radiation pattern in Equation (1) by squaring the radiation pattern magnitude and doubling the radiation pattern phase shift at each point where the beam pattern is evaluated.

For the SAR embodiment described here, the two-dimensional transmission weighting function 114 is separable:

$$p_{trans}(x,y)=p_{trans,az}(x)p_{trans,el}(y). \quad (6)$$

Figure 5A:
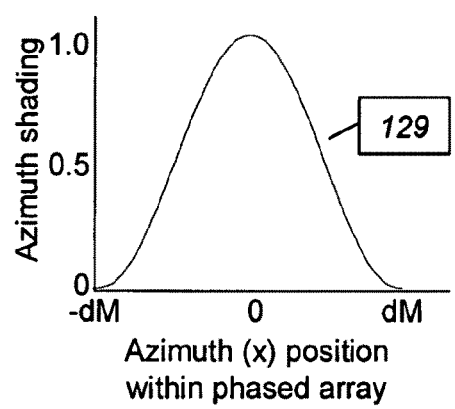
FIG. 5A is a graph of the magnitude of the azimuth dependent part of a complex array element weighting function for elements with azimuth coordinates between −dM and dM.

FIG. 5A shows the magnitude 129 of an azimuth dependent complex weighting function $$p_{trans,az}(x)=\cos^2[\pi x/(2dM)]\exp\{j\gamma \cos^2[\pi x/(2dM)]\}, -dM \leq x \leq dM. \quad (7)$$

Figure 5B:
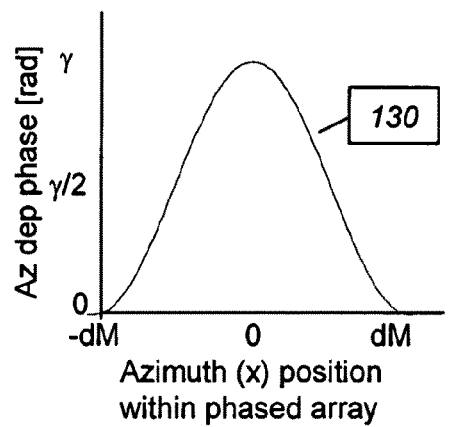
FIG. 5B is a graph of a nonlinear phase modulation function that can be used with the magnitude function in FIG. 5A, where γ is the phase modulation factor.

The magnitude of $p_{trans,az}(x)$ is a Hann weighting defined over 2M+1 azimuth (x) locations in the phased array 109 with uniform element spacing d. Since the elements at $x=\pm dM$ have zero weight, they are not utilized; the number of functional element locations in the azimuth dimension of the phased array is 2M−1. The element spacing d should be less than or equal to one-half wavelength (λ/2) for adequate spatial sampling. For a shading function that corresponds to prior art, the modulation factor γ equals zero, and the shading function in Equation (7) is real-valued. FIG. 5B shows the nonlinear phase modulation function 130 corresponding to $p_{trans,az}(x)$ in Equation (7), where the modulation factor γ may be nonzero. The Hann function phase modulation 130 in FIG. 5B and Equation (7) for nonzero y is used in the embodiment of the invention presented here.

Figure 5C:
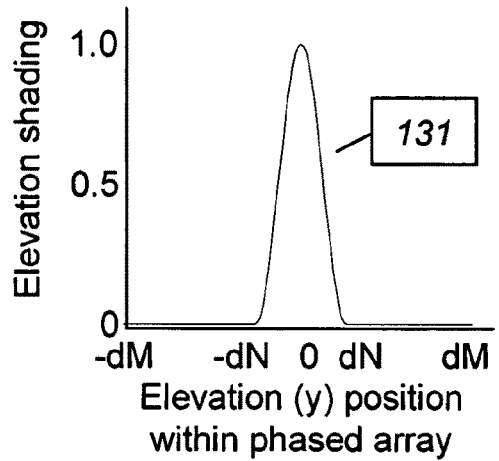
FIG. 5C is a graph of the magnitude of the elevation dependent part of a complex array element weighting function for elements with elevation coordinates between −dN and dN, where N<M.
Figure 5D:
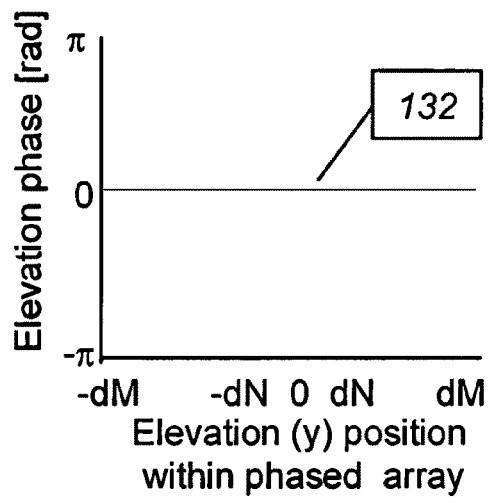
FIG. 5D is a graph of the zero-valued phase function that is used with the magnitude function in FIG. 5C when nonlinear phase modulation is applied only in azimuth and not in elevation.

FIG. 5C shows the magnitude 131 of an elevation dependent Hann shading function $$p_{trans,el}(y) = \cos^2[\pi y/(2dN)], -dN \leq y \leq dN, \quad (8)$$

and FIG. 5D shows the phase 132 of the same function, which is defined over 2N+1 elevation (y) locations in a phased array 109 with uniform spacing d≤λ/2. The number of functional element locations (with nonzero weight) in the elevation dimension of the phased array is 2N−1, where N<M for the broadside stripmap SAR embodiment described here. The shading function in Equation (8) has no phase modulation, and phase coding of the resulting beam pattern is expected to occur only in the azimuth (x) direction.

For the SAR embodiment presented here, the same array element weights (and the same array) are used for reception weights 116 as well as for transmission weights 114 in FIG. 3. The array is planar and rectangular with 129 azimuth element locations with nonzero weighting (M=65) and 31 elevation element locations with nonzero weighting (N=16). The array 109 contains 129×31 elements in this case. Element spacing is one-half wavelength.

Figure 6A:
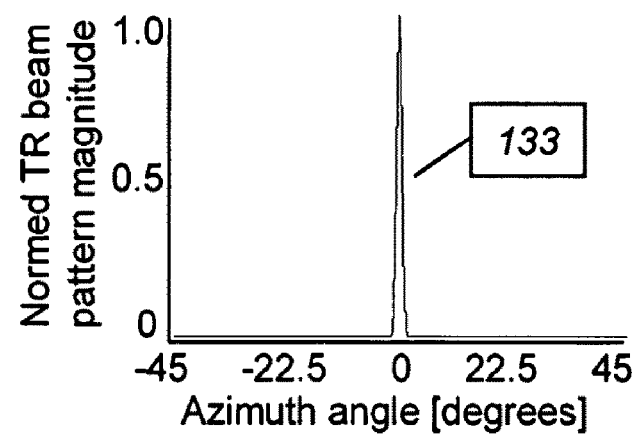
FIG. 6A is a graph of the azimuth variation of the combined transmit-receive beam pattern magnitude when the element weighting functions in FIGS. 5A-5D are applied to a rectangular phased array and when the phase modulation parameter γ equals zero (no nonlinear phase modulation of the array shading function).
Figure 6B:
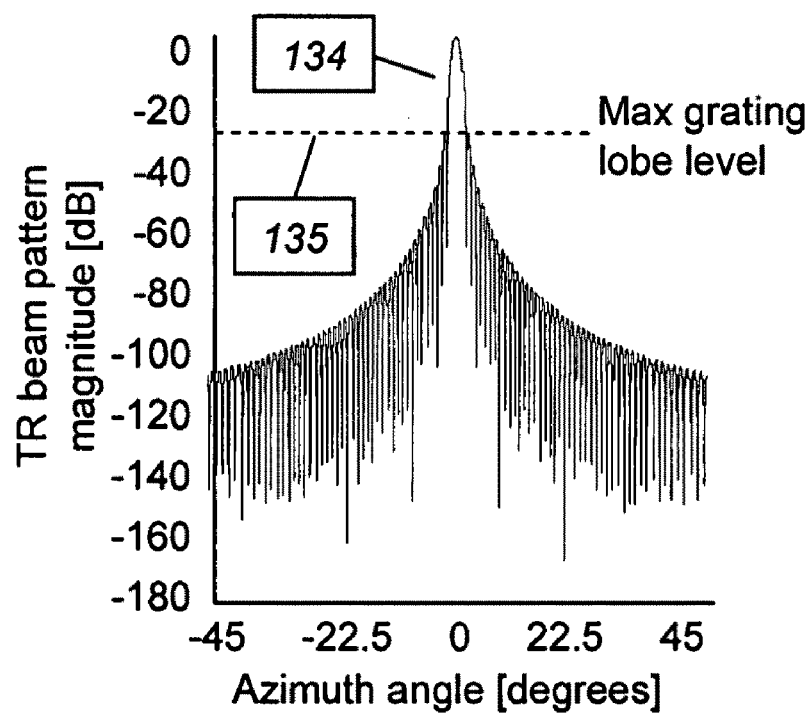
FIG. 6B is a graph of the azimuth variation of the transmit-receive beam pattern magnitude on a decibel scale when no phase modulation of the array shading function is used (γ=0), as in FIG. 6A.
Figure 6C:
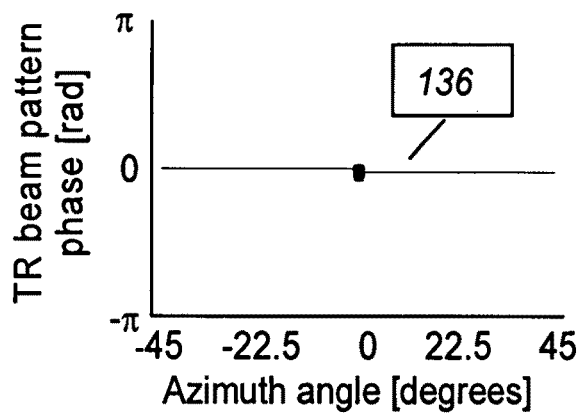
FIG. 6C is a graph of the azimuth dependent phase variation of the transmit-receive beam pattern (γ=0) in FIG. 6A.

The transmit/receive beam pattern as a function of azimuth for γ=0 is illustrated in FIGS. 6A-6C. FIG. 6A shows the magnitude, on a linear scale, of the combined transmit/receive beam pattern $P_{TR}(\theta,\phi)$ at φ=0 and when γ=0 (133), in the x,z plane in FIG. 4, with the maximum value of $|P_{TR}(\theta,0)|$ normalized to unity. $P_{TR}(\theta,\phi)$ is computed as in Equations (1)-(8) with γ=0 in Equation (7), i.e., when nonlinear phase modulation is not used (prior art). FIG. 6B shows $|P_{TR}(\theta,0)|$ 134 on a decibel scale as a function of θ in the x,z plane. The dotted line 135 in FIG. 6B denotes the maximum grating lobe (side lobe) level of the beam pattern when no phase modulation is used. FIG. 6C shows the phase of $P_{TR}(\theta,\phi)$ at φ=0 and when γ=0 (136), which is expected to be close to zero.

Figure 6D:
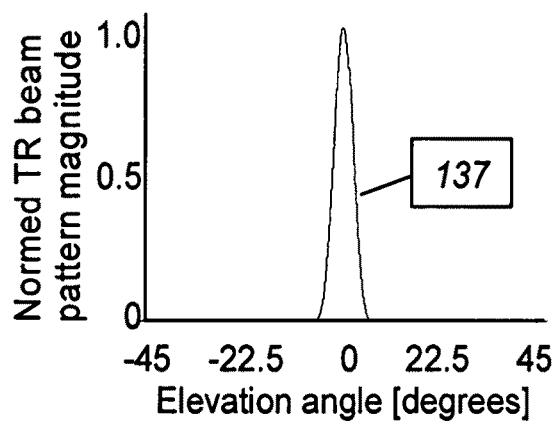
FIG. 6D is a graph of the elevation variation of the combined transmit-receive beam pattern magnitude when the element weighting functions in FIGS. 5A-5D are applied to a rectangular phased array and when the phase modulation parameter γ equals zero (no nonlinear phase modulation of the array shading function).
Figure 6E:
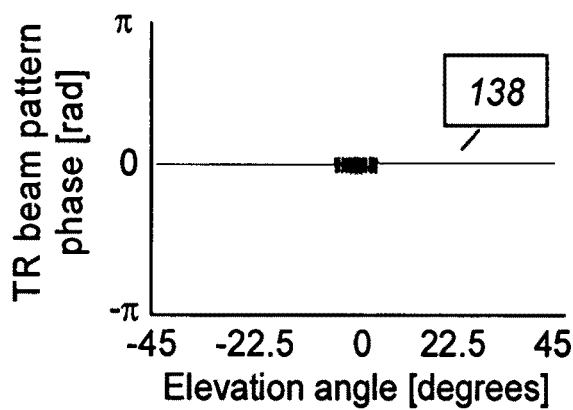
FIG. 6E is a graph of the elevation dependent phase variation of the transmit-receive beam pattern (γ=0) in FIG. 6D.

FIGS. 6D and 6E illustrate the beam pattern as a function of elevation for γ=0. FIG. 6D shows an amplitude normalized, linear-scale plot 137 of $|P_{TR}(\theta,\pi/2)|$ when γ=0, in the y,z plane in FIG. 4. FIG. 6E shows the phase 138 of $P_{TR}(\theta,\pi/2)$ when γ=0, which is expected to be close to zero.

Figure 7A:
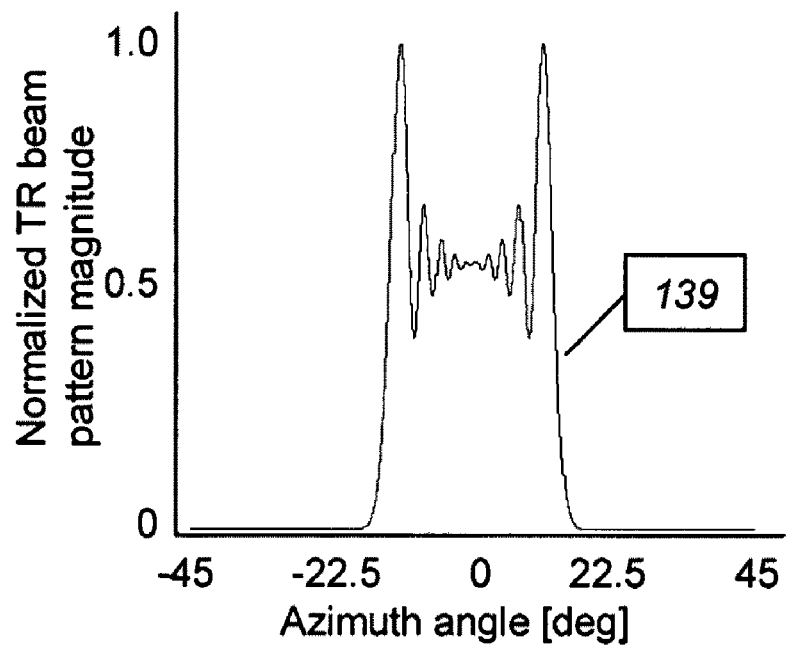
FIG. 7A is a graph of the azimuth variation of the combined transmit-receive beam pattern magnitude when the element weighting functions in FIGS. 5A-5D are applied to a rectangular phased array and when γ=30 (azimuth dependent nonlinear phase modulation of the array shading function).
Figure 7B:
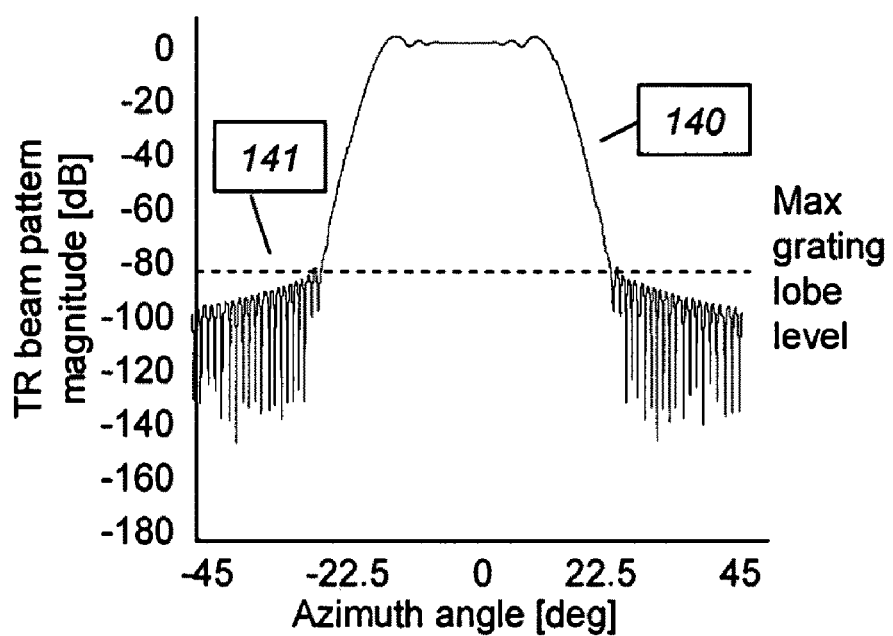
FIG. 7B is a graph of the azimuth variation of the transmit-receive beam pattern magnitude on a decibel scale when azimuth dependent nonlinear phase modulation as in FIG. 5B with γ=30 is applied to the array shading function.
Figure 7C:
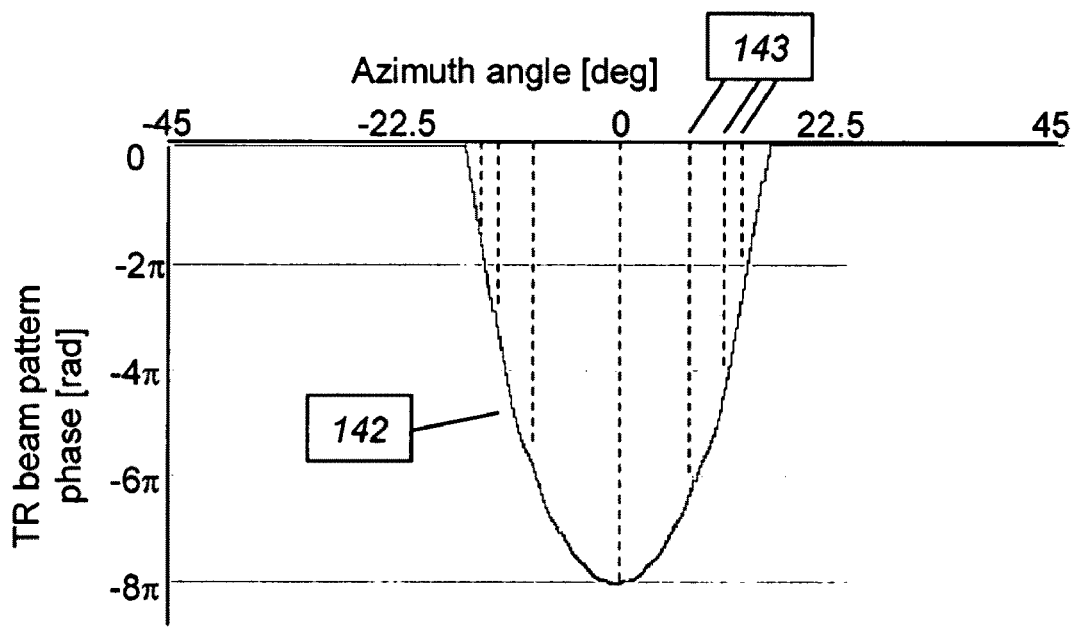
FIG. 7C is a graph of the azimuth dependent phase variation of the transmit-receive beam pattern (γ=30) in FIG. 7A.

When nonlinear phase modulation is applied to the array shading function in the azimuth direction, an example of the resulting beam pattern as a function of azimuth is illustrated in FIGS. 7A-7C. FIG. 7A shows $|P_{TR}(\theta,0)|$ 139 when γ=30 in Equation (7), amplitude normalized and on a linear scale. FIG. 7B shows a decibel scale version 140 of $|P_{TR}(\theta,0)|$ with γ=30. The dotted line 141 in FIG. 7B denotes the maximum grating lobe (side lobe) level of the beam pattern, which is 50 dB lower than in FIG. 6B. FIG. 7C shows the phase of $P_{TR}(\theta,0)$ when γ=30 (142). This function is inverted relative to zero when the sign of γ is reversed. The vertical dotted lines 143 in FIG. 7C indicate beam pattern phase angles at 2π intervals, and correspond to the dotted line phase contours 108 of the beam pattern 107 in FIG. 2.

Figure 7D:
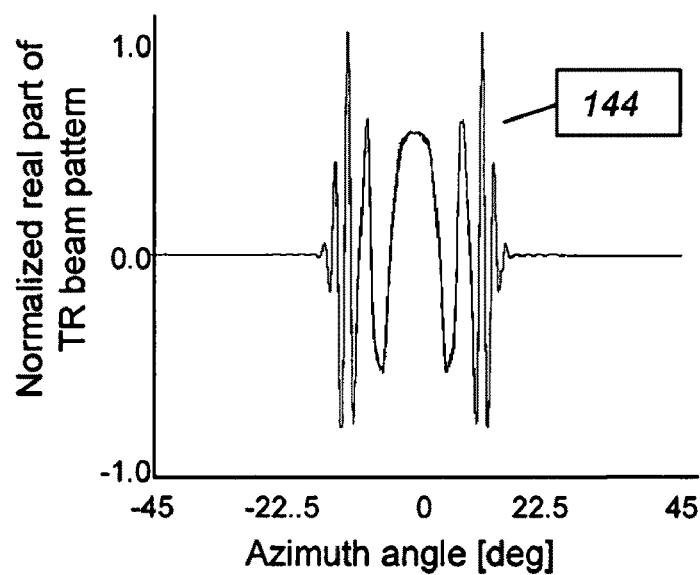
FIG. 7D is a graph of the real part (amplitude normalized) of the azimuth dependent variation of the transmit-receive beam pattern (γ=30) in FIG. 7A.
Figure 7E:
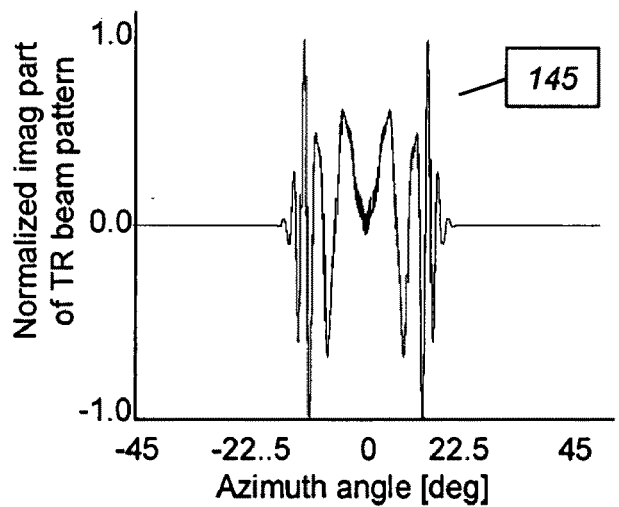
FIG. 7E is a graph of the imaginary part (amplitude normalized) of the azimuth dependent variation of the transmit-receive beam pattern (γ=30) in FIG. 7A.

FIG. 7D shows the normalized real part 144 of the azimuth dependent profile $P_{TR}(\theta,0)$ of the combined transmit-receive beam pattern $P_{TR}(\theta,\phi)$ for γ=30. This function is unaffected when the sign of γ is reversed. The time-bandwidth product of corresponding phase histories is increased by rapid, high-amplitude variation near the beam edges, resulting in improved azimuth rate resolution. FIG. 7E shows the corresponding normalized imaginary part 145 of $P_{TR}(\theta,0)$ for γ=30. This function is inverted with respect to zero when the sign of γ is reversed. When the beam moves along the path 105 in FIG. 2, the phase histories generated by the beam pattern in FIGS. 7D and 7E have relatively high velocity resolution and strong suppression of ambiguity function ridge behavior.

Figure 7F:
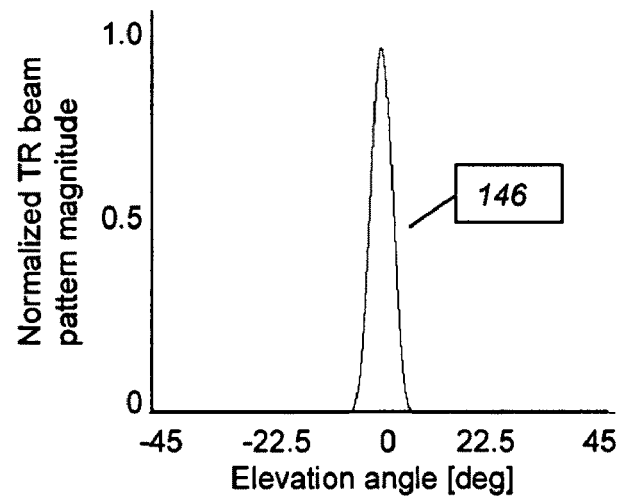
FIG. 7F is a graph of the elevation variation of the combined transmit-receive beam pattern magnitude when the element weighting functions in FIGS. 5A-5D are applied to a rectangular phased array and when γ=30 (azimuth dependent nonlinear phase modulation of the array shading function).
Figure 7G:
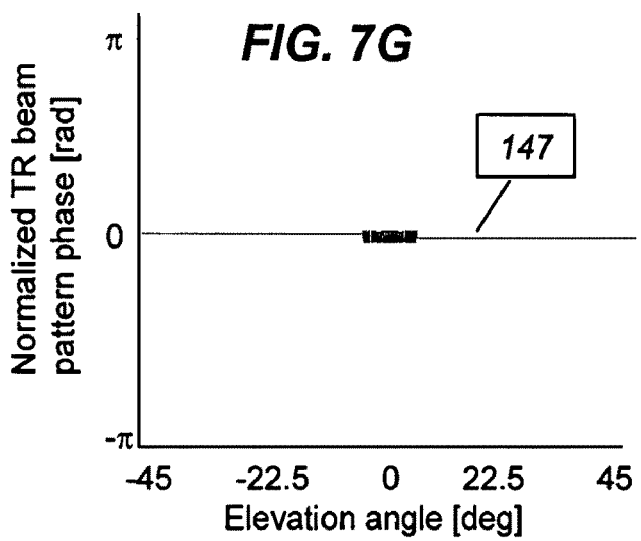
FIG. 7G is a graph of the elevation variation of the combined transmit-receive beam pattern phase when the element weighting functions in FIGS. 5A-5D are applied to a rectangular phased array and when γ=30 (azimuth dependent nonlinear phase modulation of the array shading function).

FIGS. 7F and 7G describe the beam pattern as a function of elevation for γ=30. For broadside stripmap SAR, nonlinear phase modulation is not applied to the array shading function in the elevation direction, and the elevation beam pattern for γ=30 in Equations (7) and (8) is expected to be the same as for γ=0. In FIG. 7F, the magnitude 146 of the combined transmit/receive (TR) beam pattern $P_{TR}(\theta,\phi)$ at φ=π/2 radians for γ=30 is indeed similar to its counterpart 137 in FIG. 6D. In FIG. 7G, the phase function 147 of $P_{TR}(\theta,\pi/2)$ for γ=30 is similar to its counterpart 138 in FIG. 6E.

Ambiguity functions are obtained from the beam patterns and from the geometry in FIGS. 1 and 2. The computations that are required to construct the ambiguity functions are similar to those required to implement the corresponding receiver. In order to specify these computations, the following definitions are required:

$R_0$ ≡ the smallest range between the platform (transmit-receive array location) and the target, which occurs at time $t=t_0$ and at broadside azimuth (θ=0 φ=0)

$v_{paz}$ ≡ platform velocity (relative motion between transmit/receive array and target environment) along the path 105 shown in FIGS. 1 and 2

$v_{tr}$ ≡ range rate, the target velocity component (measured relative to the platform) that is orthogonal to the path 105 in FIGS. 1 and 2.

$v_{taz}$ ≡ target azimuth rate that is not included in the platform velocity $t_0$ ≡ time when the target is at broadside azimuth; estimation of target azimuth is equivalent to estimation of $t_0$ t ≡ time measured relative to the time when the target is at broadside azimuth; $|t-t_0| \leq T_{obs}/2$ $T_{obs}$ ≡ phase history observation time ≈ $B_{10dB}R_0/v_{paz}$ $B_{10dB}$ ≡ beam width [radians] determined by the interval between the points where the beam pattern drops to one-tenth of its maximum value.

The time-varying range between a point target and the center of the transmit-receive array is $$R(t|t_0, v_{tr}, v_{taz}) = [(R_0 + \text{along-range displacement})^2 + \quad (9)$$
$$(\text{cross-range displacement})^2]^{1/2}$$
$$= \sqrt{[R_0 + v_{tr}(t-t_0)]^2 + [(v_{paz}+v_{taz})(t-t_0)]^2}.$$

Assuming that $|v_{tr}(t-t_0)| \leq |v_{tr}|T_{obs}/2 << R_0$, $$R(t|t_0,v_{tr},v_{taz}) \approx R_0 + v_{tr}(t-t_0) + [(v_{paz}+v_{az})^2/2R_0](t-t_0) \quad (10)$$

For a signal center frequency with wavelength λ, the range dependent phase shift for two-way propagation is $$\phi_{range}(t|t_0,v_{tr},v_{taz}) = (4\pi/\lambda)R(t|t_0,v_{tr},v_{taz}). \quad (11)$$

This phase shift function has a linear component $(4\pi/\lambda)v_{tr}(t-t_0)$ corresponding to a frequency shift of the corresponding phase history, and a quadratic component $(4\pi/\lambda)[(v_{paz}+v_{taz})^2/(2R_0)](t-t_0)^2$ that depends on platform velocity and cross-range velocity.

If $v_{taz}$ is in the same direction as $v_{paz}$ (positive $v_{taz}$), the phase history is compressed in time, with a corresponding increase in the linear FM chirp rate associated with the quadratic phase variation. Conversely, if $v_{taz}$ is in the opposite direction from $v_{paz}$ (negative $v_{taz}$), the phase history is dilated in time, with a corresponding decrease in the linear FM chirp rate associated with the quadratic phase variation.

The time-varying azimuth angle between a point target and the center of the transmit-receive array is $$\theta(t \mid t_0, v_{tr}, v_{taz}) = \tan^{-1}\left[\frac{\text{cross-range azimuth displacement}}{R_0 + \text{along-range displacement}}\right]. \quad (12)$$

Again assuming that $|v_{tr}(t-t_0)| \leq |v_{tr}|T_{obs}/2 \ll R_0$, $$\theta(t|t_0,v_{tr},v_{azz}) \approx \tan^{-1}\{[(v_{paz}+v_{taz})/R_0]t\}. \quad (13)$$

For a combined transmit-receive beam pattern $P_{TR}(\theta,\phi)$, the beam-induced time-dependent echo variation is $P_{TR}[\theta(t|t_0,v_{tr},v_{taz}),\phi]$, where $\theta(t|t_0,v_{tr},v_{taz})]$, is given by Equation (13). The beam-induced phase modulation is $$\phi_{beam}(t|t_0,v_{tr},v_{taz}) = \tan^{-1}\{\text{imag}\{P_{TR}[\theta(t|t_0,v_{tr},v_{taz}),\phi]\}/\text{real}\{P_{TR}[\theta(t|t_0,v_{tr},v_{taz}),\phi]\}\} \quad (15)$$

and the beam-induced amplitude modulation is $|P_{TR}[\theta(t|t_0, v_{tr},v_{taz}),\phi]|$.

The complete phase history function (including amplitude variation) for the point target is $$h_{az}(t|t_0,v_{tr},v_{taz}) = |P_{TR}[\theta(t|t_0,v_{tr},v_{taz}),\phi]|\exp\{j/\phi_{rang}(t|t_0, v_{tr},v_{taz})+\phi_{beam}(t|t_0,v_{tr},v_{taz})]\}. \quad (16)$$

Broadside stripmap SAR ambiguity functions are obtained by correlation of an energy normalized data phase history $h_{az}$ $(t|0,0,0)$ with a sequence of energy normalized reference (hypothesized) phase histories $h_{az}(t|t_0,v_{tr},v_{taz})$ for different to values (azimuth$\equiv v_{paz}t_0$), range rates $v_{tr}$ and target azimuth rates $v_{taz}$:

$$|\chi_{az}(t_0, v_{tr}, v_{taz})|^2 = \left|\int_{-\infty}^{\infty} h_{az}(t\mid 0,0,0)h_{az}^*(t\mid t_0, v_{tr}, v_{taz})dt\right|^2. \quad (17)$$

A frequency domain implementation of the inner product in Equation (17) takes advantage of the fact that $v_{tr}$ is associated with a frequency shift, and that different $t_0$ values are easily hypothesized by computing the inverse Fourier transform of the frequency domain product of the Fourier transform of the data phase history and the conjugated Fourier transform of a reference (hypothesized) phase history.

The generalized ambiguity function in Equation (17) represents the response of an estimator/detector receiver that is optimum for additive white, Gaussian noise, when the phase histories for specified $t_0$, $v_{tr}$, $v_{taz}$ are known except for a constant phase shift, and the additive noise power is zero. The ambiguity function can be constructed from the delay-dependent outputs of a bank of matched filters, where each filter impulse response is a conjugated, time-reversed phase history corresponding to a different $v_{tr}$, $v_{taz}$ pair.

A receiver for SAR data from a phase modulated beam pattern is implemented as in Equation (17) with the noise-free point target phase history replaced by the data phase history:

Estimator/detector receiver response for hypothesized parameters $$t_0, v_{tr}, v_{taz} = \quad (18)$$
$$|\chi_{az,data-ref}(t_0, v_{tr}, v_{taz})|^2 = \left|\int_{-\infty}^{\infty} h_{az,data}(t)h_{az,ref}^*(t \mid t_0, v_{tr}, v_{taz})dt\right|^2$$

where $h_{az,ref}(t|t_0,v_{tr},v_{taz})$ in Equation (18) equals $h_{az}(t|t_0,v_{tr},v_{taz})$ in Equation (16). The receiver in Equation (18) implements a generalized data-reference cross ambiguity function. When a data phase history is not energy normalized and the reference phase histories are energy normalized, the output of the estimator/detector is proportional to the squared amplitude of the data phase history and is thus an estimate of relative target strength. In this case, the outputs of the estimator/detector in equation (18) for various hypothesized ranges, azimuths, range rates, and azimuth rates comprise a map of target strength as a function of the four variables range, azimuth, range rate, and azimuth rate. This map is a generalized synthetic aperture image, which conventionally represents target strength as a function of range and azimuth.

Figure 8A:
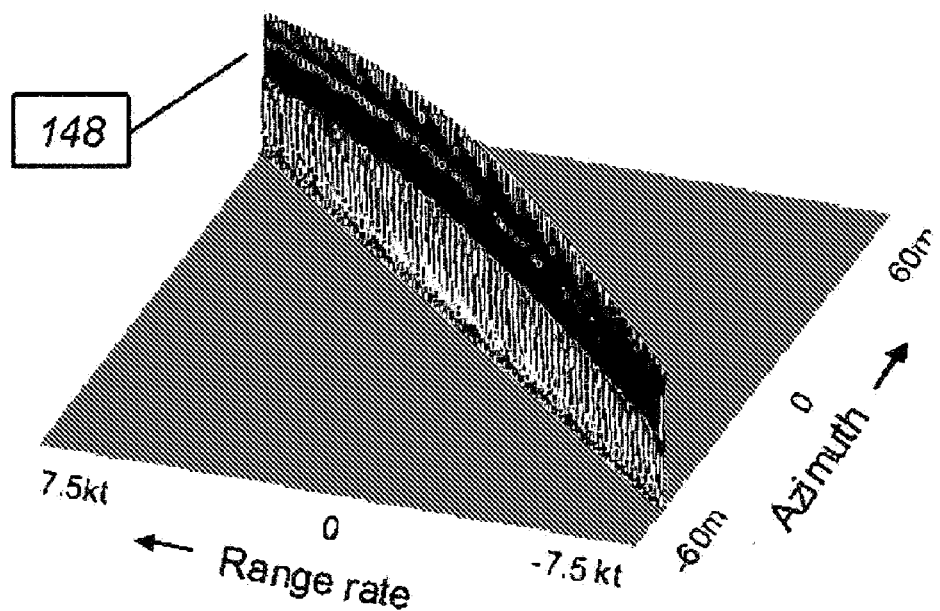
FIG. 8A is a graph of the azimuth/range-rate ambiguity function for a broadside stripmap synthetic aperture radar that uses the transmit-receive beam pattern in FIGS. 6A-6E (no phase modulation).
Figure 8B:
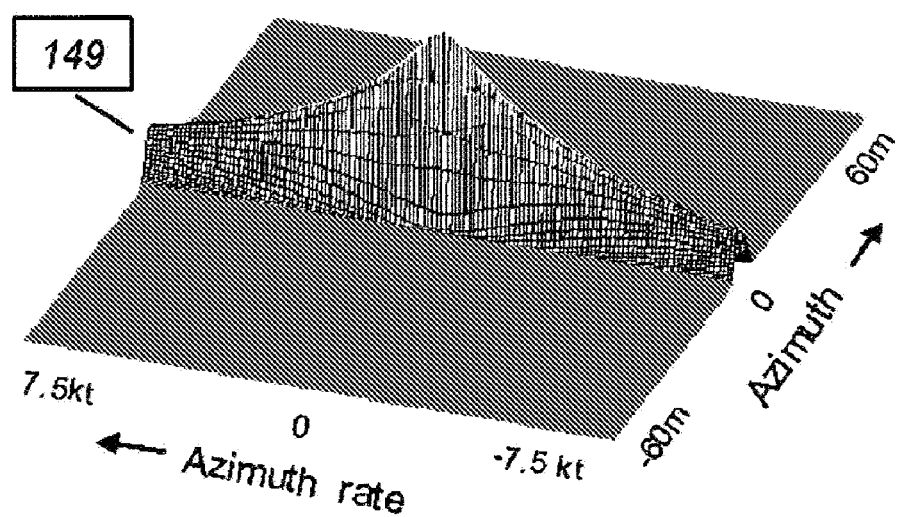
FIG. 8B is a graph of the azimuth/azimuth-rate generalized ambiguity function for a broadside stripmap SAR with transmit-receive beam pattern as in FIGS. 6A-6E (no phase modulation).

FIG. 8A shows the broadside stripmap SAR azimuth/range-rate ambiguity function 148 when the same array weighting functions are used for transmission and reception as in Equation (4), the azimuth and elevation weighting function is separable as in Equation (6), the azimuth dependent part of aperture weighting function is given by Equation (7) with $\gamma=0$, the elevation part is given by Equation (8), and M=65 and N=16 in Equations (7) and (8), respectively. FIG. 8B shows the corresponding azimuth/azimuth-rate ambiguity function 149. The azimuth/range-rate ambiguity function in FIG. 8A is obtained from the azimuth/range-rate/azimuth-rate ambiguity function by assuming zero error in the azimuth rate hypothesis. Similarly, the azimuth/azimuth-rate ambiguity function in FIG. 8B assumes zero range rate error. The corresponding beam patterns are shown in FIGS. 6A-6E.

Figure 9A:
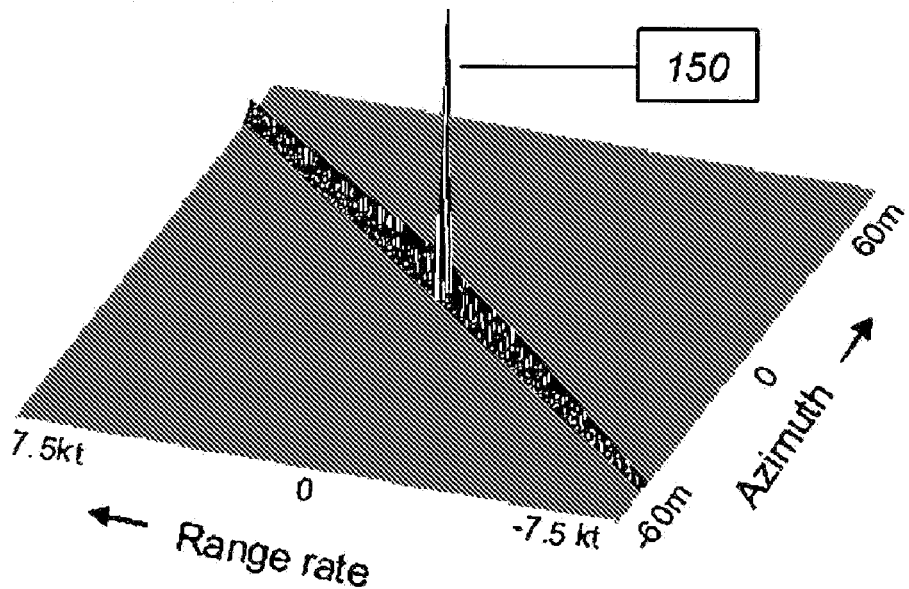
FIG. 9A is a graph of the azimuth/range-rate ambiguity function for a broadside stripmap synthetic aperture radar that uses the transmit-receive beam pattern in FIGS. 7A-7G, which is obtained from Hann function phase modulation of the array shading function as in FIG. 5B with γ=30.
Figure 9B:
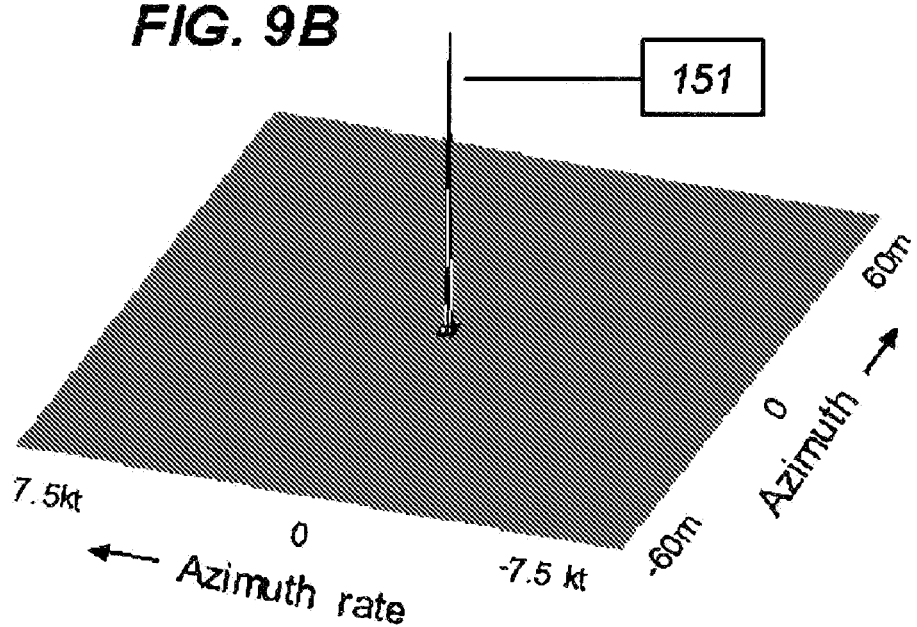
FIG. 9B is a graph of the azimuth/azimuth-rate generalized ambiguity function for a broadside stripmap SAR with transmit-receive beam pattern as in FIGS. 7A-7G (obtained by nonlinear phase modulation of the array shading function with γ=30).

FIGS. 9A and 9B show ambiguity functions generated under the same conditions as in FIGS. 8A and 8B, except that the azimuth dependent part of the array shading function has nonlinear phase modulation; $\gamma=30$ in Equation (7). FIG. 9A shows the azimuth/range-rate ambiguity function 150 for $\gamma=30$, and FIG. 9B shows the azimuth/azimuth-rate ambiguity function 151 for $\gamma=30$. The corresponding beam patterns are shown in FIGS. 7A-7G. Comparison of the ambiguity functions in FIGS. 8A and 8B with those in FIGS. 9A and 9B indicates that significant improvements are obtained when appropriate phase modulation or coding is applied to the array weighting (shading) function.

Improved detection performance in clutter is associated with increased signal-to-clutter ratio (SCR). The "signal" in the SCR calculation is the expected receiver response to a point target in the absence of noise and clutter, and is represented by the ambiguity function amplitude with perfect parameter hypotheses, at the origin of the ambiguity function coordinates. The "clutter" in the SCR calculation is the expected receiver response to clutter, and is represented by the three dimensional integral of the product of the ambiguity function and the clutter distribution in azimuth/range-rate/azimuth-rate space.

Figure 10A:
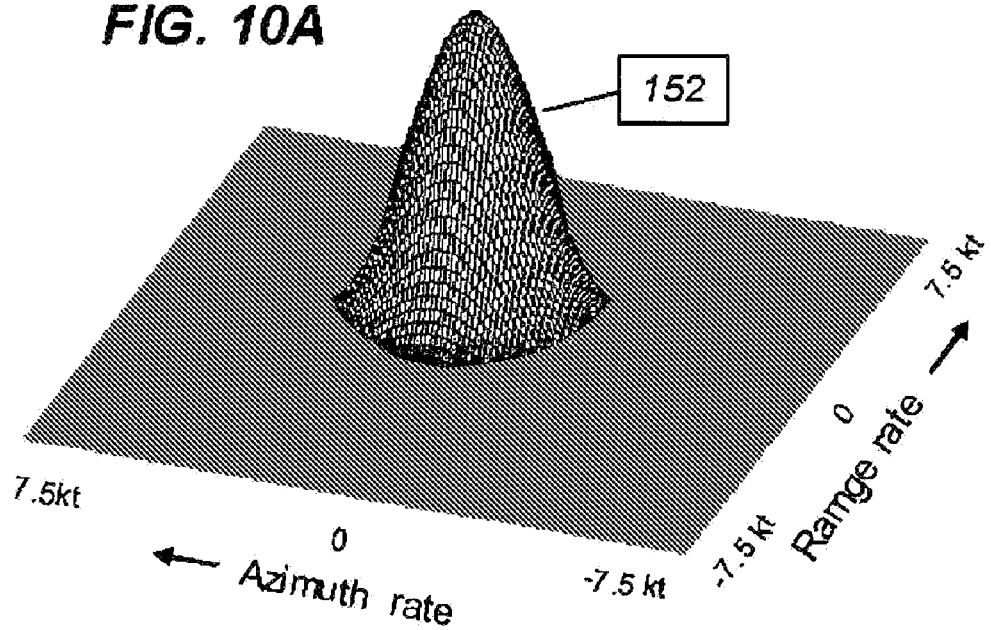
FIG. 10A is a graph of the range rate, azimuth rate distribution of typical sea clutter.
Figure 10B:
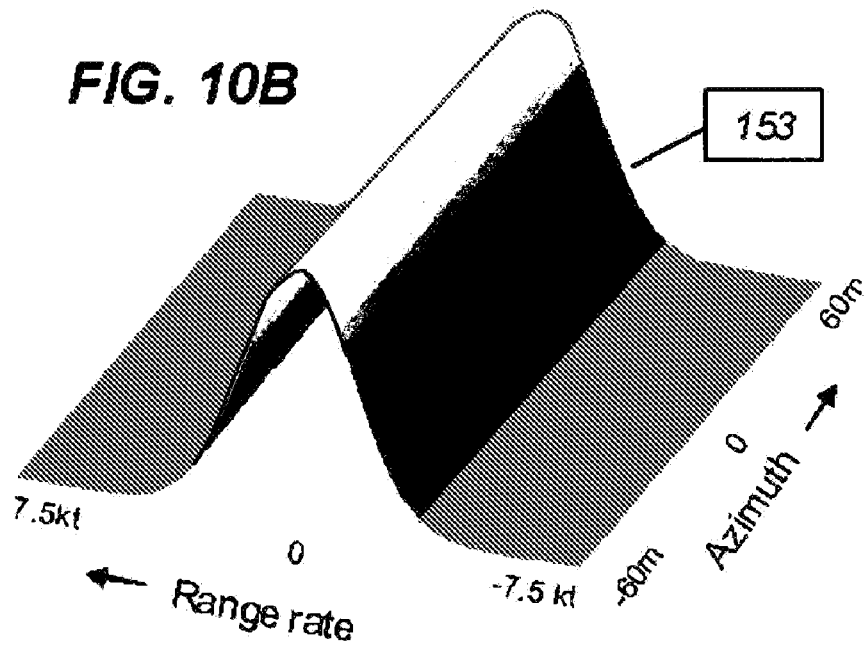
FIG. 10B is a graph of the azimuth, range rate distribution of spatially invariant sea clutter with a typical velocity distribution.
Figure 10C:
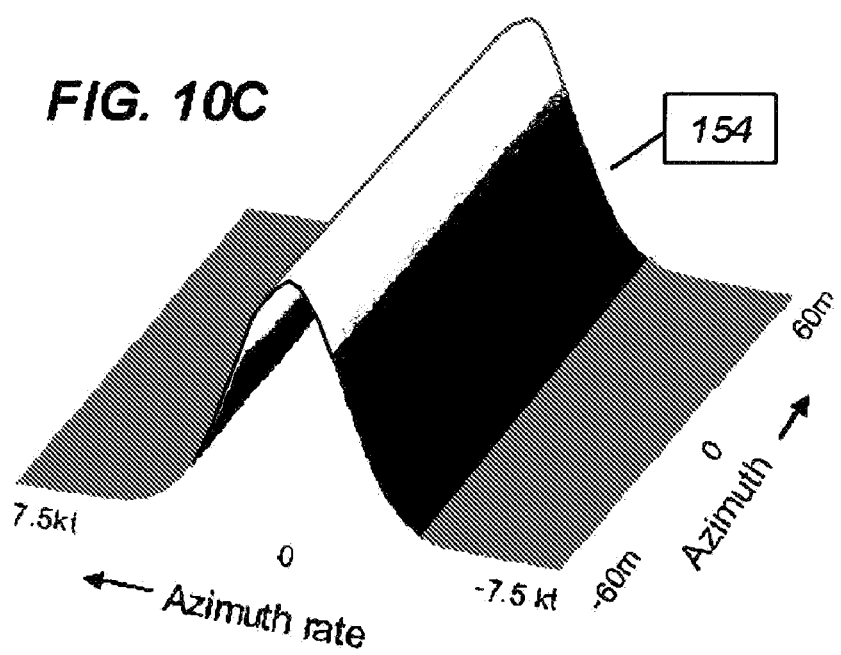
FIG. 10C is a graph of the azimuth, azimuth rate distribution of spatially invariant sea clutter with a typical velocity distribution.

For maritime radar, a model for the sea clutter distribution is shown in FIGS. 10A-10C. This distribution model was obtained from an average velocity distribution for sea clutter (M. I. Skolnik, "Sea Echo," in *Radar Handbook*, M. I. Skolnik, ed., McGraw-Hill, New York, 1970), with the additional assumptions that the sea clutter velocity distribution is the same in azimuth-rate and range-rate and is uniformly distributed in azimuth. FIG. 10A shows the range-rate/azimuth-rate sea clutter model distribution 152, FIG. 10B shows the azimuth/range-rate sea clutter model distribution 153, and FIG. 10C shows the azimuth/azimuth-rate sea clutter model distribution 154. When the target is moving, the clutter distribution is shifted relative to the origin of the ambiguity plane before computing the three dimensional integral.

Figure 11:
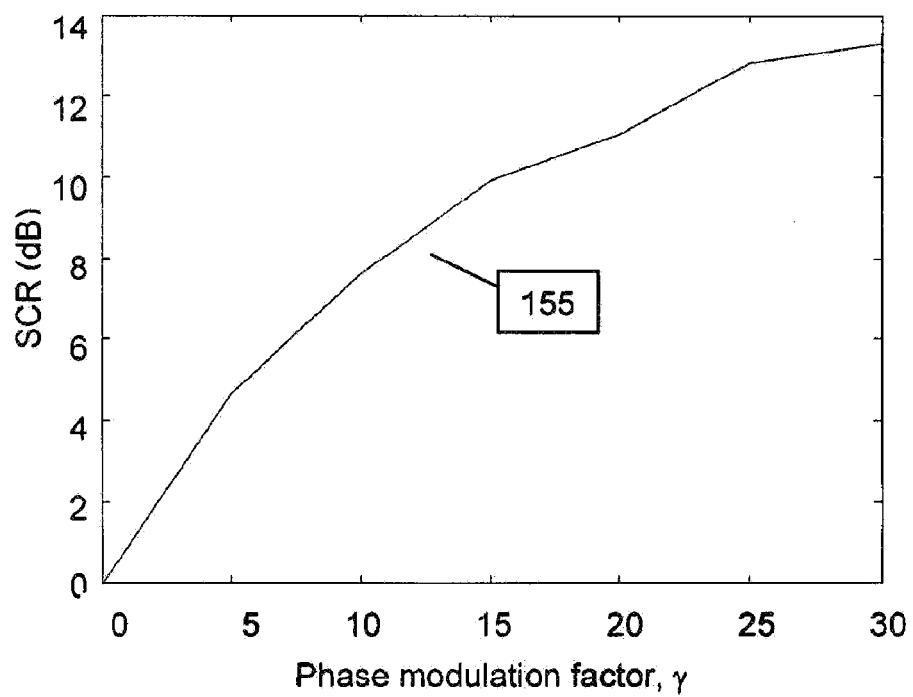
FIG. 11 is a graph of predicted broadside stripmap SAR signal-to-clutter ratio as a function of the nonlinear phase modulation parameter γ.

SCR has been calculated using the three dimensional ambiguity functions represented by FIGS. 8A, 8B, 9A, and 9B, and the three dimensional clutter distribution model represented by FIGS. 10A, 10B, and 10C. In these calculations, a persistent point target is assumed to have a range rate of 2.5 kt and an azimuth rate of 2.5 kt. FIG. 11 shows a function 155 representing the SCR for various modulation factors γ, divided by the SCR for γ=0, on a decibel scale. FIG. 11 demonstrates the improved detection performance that is expected when the invention is properly applied, i.e., when suitable nonlinear phase modulation as in Equation (7) is applied to the array shading function.

For a broadside stripmap maritime SAR that uses the array weighting function in Equations (7) and (8), SCR becomes larger as the modulation factor |γ| increases, as indicated by FIG. 11. This improvement is limited by a bound on the maximum value of |γ| that is obtained from spatial sampling considerations. The instantaneous frequency corresponding to the phase variation in Equation (7) is $$f_{inst}(x)[\text{rad}/m] = (d/dx)\gamma\cos^2[\pi x/(2dM)] \quad (19)$$
$$= -2\gamma[\pi/(2dM)]\cos[\pi x/(2dM)]\sin[\pi x/(2dM)]$$
$$= -[\pi\gamma/(2dM)]\sin[\pi x/(dM)], -dM \le x \le dM.$$

The phase change between array elements is the frequency in radians per meter multiplied by the element spacing d in meters per element:

$$\text{Phase change per element} = -[\pi\gamma/(2M)]\sin[\pi x/(dM)], -dM \le x \le dM. \quad (20)$$

The maximum absolute phase change per element in the azimuth (x) direction is $$\max_{-dM \le x \le dM}|\text{Phase change per element}| = \pi|\gamma|/(2M)[\text{rad/element}]. \quad (21)$$

For adequate spatial sampling, the maximum phase change between elements should be less than or equal to π radians, which implies that $$|\gamma| \le 2M = \text{no. of functional array element rows (in the azimuth direction)} + 1 \quad (22)$$

where functional array element rows have nonzero element weighting function magnitude.

For |γ|=30 in Equation (22), the number of functional array element rows in the azimuth direction should be greater than or equal to 59. At X-band (λ=3 cm), an array that is L meters long in azimuth with element spacing λ/2, contains approximately 67 L element rows. If |γ|≤67 L+1, then |γ|=30 corresponds to an X-band array that is at least 43 cm long in the azimuth direction. A longer array can accommodate a larger value of |γ|.

Figure 12:
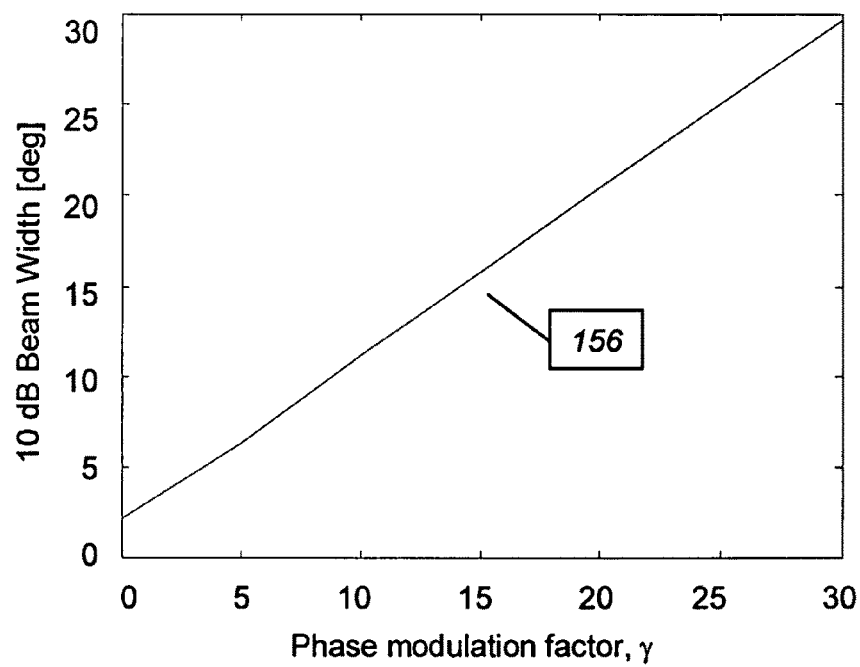
FIG. 12 shows the 10 dB beam width in the azimuth direction as a function of the absolute value of the modulation factor.

A second constraint on |γ| pertains to permissible observation time. The phase modulated beam pattern 139 in FIG. 7A is approximately 14 times wider than the unmodulated beam pattern in FIG. 5A. The corresponding observation time is 14 times longer. This increased observation time may violate assumptions concerning constant velocity motion and the persistence/variation of target and clutter echoes. FIG. 12 shows the 10 dB beam width in the azimuth direction 156 as a function of the absolute value of the modulation factor |γ|. The observation time (phase history duration) is approximately equal to the 10 dB beam width in radians multiplied by the minimum range $R_0$ to the target, divided by the platform velocity $v_{paz}$ along the path 105 in FIG. 2.

A third constraint on |γ| is that the phase-modulated beam pattern should not cause under sampling of beam-induced phase histories as a target moves through the beam. The maximum absolute value of the beam-induced phase change between echoes should be less than or equal to π radians. The maximum absolute value of the beam-induced phase change between echoes equals the maximum absolute value of the slope of the phase function 142 in FIG. 7C multiplied by the azimuth change between observations in radians. If $R_0$ is the target range at broadside, the azimuth change between obser vations in radians is $$\tan^{-1}\left[\frac{\text{cross-range azimuth displacement between observations}}{R_0 + \text{along-range displacement between observations}}\right]. \quad (23)$$

Letting PRI denote the radar pulse repetition interval, the cross-range azimuth displacement between observations equals (the radar platform velocity+azimuth rate)×PRI and the along-range displacement between observations equals (the target range rate)×PRI. If PRI=ζ$R_0$/c where ζ is a constant (usually greater than ten) and c is the propagation velocity, the argument of the arctangent function is approximately ζ$v_{paz}$/c where $v_{paz}$ is the radar platform velocity. The quantity $v_{paz}$/c is usually very small, and ζ$v_{paz}$/c<<1. The azimuth change in radians between observations is usually very small, and the third constraint is rarely an important limitation for |γ|.

Appropriate beam phase modulation improves synthetic aperture resolution in azimuth, range rate and azimuth rate, and suppresses ambiguity function ridges. This improvement implies that a four dimensional output representation is relevant, i.e., a map of target strength as a function of range, azimuth, range rate, and azimuth rate. This dimensionality increase is of no concern for computer analysis of estimator/detector outputs, provided the computer has sufficient memory and processing speed. The increased dimensionality is important, however, for display of the outputs for the benefit of a human observer.

A stripmap representation that is suitable for a human observer can be obtained as follows. At a given stripmap (range, azimuth) pixel location, the most likely range rate $\hat{v}_{tr}$ and azimuth rate $\hat{v}_{taz}$ (conditioned on the pixel range and azimuth values) are the values of $v_{tr}$ and $v_{taz}$ that maximize $|X_{az,data-ref}(t_0, v_{tr}, v_{taz})|^2$ in Equation (18) for the specified pixel azimuth ($t_0$) and range. The corresponding maximum value $|X_{ax,data-ref}(t_0, \hat{v}_{tr}, \hat{v}_{taz})|^2$ is the target strength estimate at the pixel location. The maximum likelihood range rate $\hat{v}_{tr}$ and azimuth rate $\hat{v}_{taz}$ at the pixel location can be combined into a single velocity parameter $|\hat{v}| = \sqrt{\hat{v}_{tr}^2 + \hat{v}_{taz}^2}$. In the stripmap for human observation, the target strength estimate at the pixel location is represented by pixel intensity (brightness), and the velocity estimate |v̂| at the pixel location is represented by a pixel color code.

Such a generalized display is unnecessary if the observer specifies $v_{tr}$ and $v_{taz}$ values that are of interest. In this case, the four dimensional target strength map is evaluated at the specified $v_{tr}$ and $v_{taz}$ values, resulting in a conventional stripmap function of range and azimuth. In ultrasonic ISAS for noninvasive flow measurement in a conduit (e.g., a blood vessel), the observer may specify range (distance from the transducer array, orthogonal to the array surface) and azimuth (e.g. the zero-azimuth line orthogonal to the array), and the resulting display represents target strength at the chosen location as a function of fluid velocity components parallel and orthogonal to the conduit.

In practice, an observer often is interested in the difference between the current data image and a reference image. The reference image can represent the average clutter in the surrounding area at the observation time or a registered image of the same area that was viewed at a previous time. The difference image can be obtained by subtracting the reference image from the current image, or by subtracting log (reference image plus a small constant) from log(current image plus a small constant), which is equivalent to creating a normalized image via division of the current image by the reference image. At each range and azimuth, the display shown to the observer represents the maximum over all relevant range rates and azimuth rates of the difference image at the specified range and azimuth. If the range rate and azimuth rate of interest can be specified by the observer, then the range, azimuth map shown to the observer is the difference image evaluated at the given values of $v_{tr}$ and $v_{taz}$. A nonnegative difference image is obtained by applying a nonlinear operation such as half-wave rectification (the image sample value or zero, whichever is largest), an exponentiation operation, an absolute value operation, or squaring, depending on the application.

Broadside stripmap SAR as described in Equations (1)-(18) and FIGS. 1-12 is an important embodiment of the invention, but some other embodiments involve relative motion of the target environment and the transmitter/receiver platform in three dimensions (range, azimuth, and elevation). Examples are ultrasonic ISAS observation of fluid flow in which the orientation of the fluid velocity vector in the azimuth-elevation plane is unknown, or ISAR processing of objects that can cross the beam in more than one direction. Some additional definitions are required for three dimensional analysis:

$v_{pr}$=range rate component of platform velocity (relative motion between the transmit/receive array and the target environment in the direction orthogonal to the azimuth, elevation plane)

$v_{pel}$=elevation component of platform velocity (relative motion between the transmit/receive array and the target environment in the elevation direction)

$v_{tel}$=target elevation rate that is not included in the platform velocity.

A combined transmit-receive phase modulated beam pattern $P_{TR}(\theta,\phi)$ that is phase coded in both azimuth ($\phi=0$) and elevation ($\phi=\pi/2$) is used.

For two cross range dimensions with $|(v_{pr}+v_{tr})(t-t_0)| \leq |v_{pr}+v_{tr}|T_{obs}/2 \ll R_0$, $$\theta(t|t_0,v_{tr},v_{taz}) \cong \tan^{-1}\{[(v_{paz}+v_{taz})/R_0]t\} \equiv \theta(t), \quad (25)$$

$$\phi(t|t_0,v_{tr},v_{tel}) \cong \tan^{-1}\{[(v_{pel}+v_{tel})/R_0]t\} \equiv \phi(t), \quad (26)$$

and the range dependent phase shift for two-way propagation is $$\phi_{range}(t|t_0,v_{tr},v_{taz},v_{tel})=(4\pi/\lambda)R(t|t_0,v_{tr},v_{taz},v_{tel}). \quad (27)$$

For a combined transmit-receive beam pattern $P_{TR}(\theta,\phi)$, the beam-induced time-dependent echo variation is $P_{TR}[\theta(t|t_0,v_{tr},v_{taz}), \phi(t|t_0,v_{tr},v_{tel})]$ where $\theta$ and $\phi$ are given by Equations (25) and (26), respectively.

The beam-induced phase modulation is $$\phi_{beam}(t|t_0,v_{tr},v_{taz},v_{tel})=\tan^{-1}\{imag\{P_{TR}[\theta(t),\phi(t)]\}/real\{P_{TR}[\theta(t),\phi(t)]\}\}, \quad (28)$$

the beam-induced amplitude modulation is $|P_{TR}[\theta(t),\phi(t)]|$, and the complete phase history function (including amplitude variation) for the point target is $$h_{az,el}(t|t_0, v_{tr}, v_{taz}, v_{tel}) = |P_{TR}[\theta(t|t_0, v_{tr}, v_{taz}), \phi(t|t_0, v_{tr}, v_{tel})]| \times \quad (29)$$
$$\exp\{j[\varphi_{range}(t|t_0, v_{tr}, v_{taz}, v_{tel}) + \varphi_{beam}(t|t_0, v_{tr}, v_{taz}, v_{tel})]\}.$$

The generalized ambiguity function corresponding to an energy normalized data phase history with $t_0=v_{tr}=v_{taz}=v_{tel}=0$ and energy normalized reference phase histories with various hypothesized values of $t_0$, $v_{tr}$, $v_{taz}$, and $v_{tel}$ is a function of four variables:

$$|\chi_{az,el}(t_0, v_{tr}, v_{taz}, v_{tel})|^2 = \quad (30)$$
$$\left|\int_{-\infty}^{\infty} h_{az,el}(t|0,0,0,0)h_{az,el}^*(t|t_0, v_{tr}, v_{taz}, v_{tel})dt\right|^2.$$

The receiver corresponding to Equation (30) is implemented with a generalized data-reference cross ambiguity function as in Equation (18):

Estimator/detector receiver response for hypothesized parameters $$t_0, v_{tr}, v_{taz}, v_{tel} = |\chi_{az,el,data-ref}(t_0, v_{tr}, v_{taz}, v_{tel})|^2 = \quad (31)$$
$$\left|\int_{-\infty}^{\infty} h_{az,el,data}(t)h_{az,el,ref}^*(t|t_0, v_{tr}, v_{taz}, v_{tel})dt\right|^2$$

where $h_{az,el,ref}(t|t_0,v_{tr},v_{taz},v_{tel})$ in Equation (31) equals $h_{az,el}(t|t_0,v_{tr},v_{taz},v_{tel})$ in Equation (29). If data phase histories are not energy normalized and reference phase histories are energy normalized, estimator/detector outputs are representative of relative target strengths at the hypothesized parameter values. A map of relative target strengths at various hypothesized ranges, azimuths, elevations, range rates, azimuth rates, and elevation rates comprises a further generali- $$R(t|t_0, v_{tr}, v_{taz}, v_{tel}) = \sqrt{[R_0 + (v_{pr} + v_{tr})(t-t_0)]^2 + [(v_{paz} + v_{taz})(t-t_0)]^2 + [(v_{pel} + v_{tel})(t-t_0)]^2} \quad (24)$$
$$\cong R_0 + (v_{pr} + v_{tr})(t-t_0) + \{[(v_{paz} + v_{taz})^2 + (v_{pel} + v_{tel})^2]/2R_0\}(t-t_0)^2,$$

zation of a conventional synthetic aperture image. The added image dimensions make depictions for a human observer (without loss of information) more difficult than in the lower dimensionality case represented by FIG. 2 and Equation (18). Computer-aided analysis is not adversely affected by the increased dimensionality if memory and processing speed are adequate.

Human observation of the estimator/detector outputs is feasible if difference images are computed as in the lower dimensionality case. At a chosen range, azimuth, and elevation sample, values of $v_{tr}$, $v_{taz}$, and $v_{tel}$ are selected to correspond with the maximum difference image value; the maximum is computed with respect to range rate, azimuth rate, and elevation rate at the chosen range, azimuth, and elevation. The resulting map of target strength difference as a function of range, azimuth, and elevation can be depicted by a sequence of azimuth, elevation plots corresponding to different range values or by a sequence of range, azimuth plots corresponding to different elevation values, depending on the application. Similar difference representations are used if $v_{tr}$, $v_{taz}$, and $v_{tel}$ are specified by an observer.

Figure 13A:
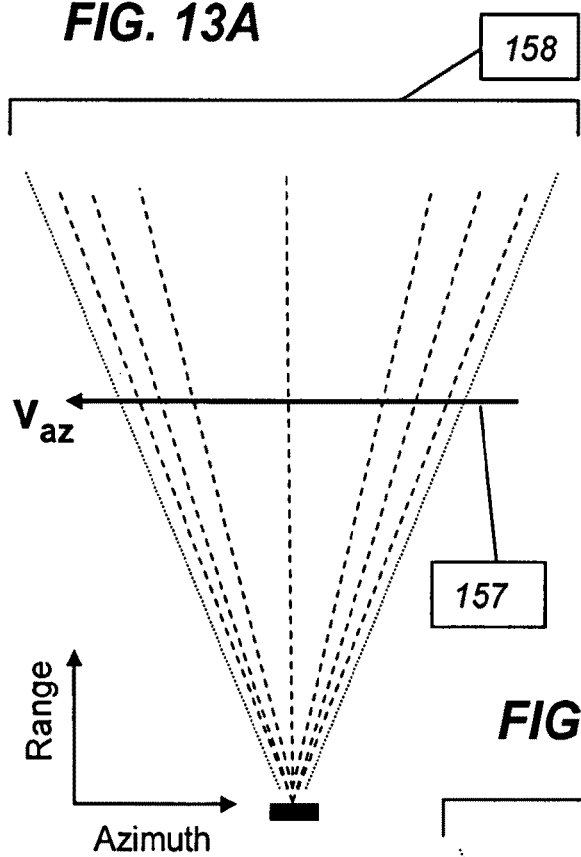
FIG. 13A shows the phase history of a target that moves along vector Vaz relative to the azimuth-coded beam pattern.

The many possible combinations of the four variables $t_0$, $v_{tr}$, $v_{taz}$, $v_{tel}$ increase the opportunity for high ambiguity sidelobes. One obvious example occurs when the beam pattern is separable and the component azimuth and elevation beam patterns are the same: $P_{TR}(\theta,0)$ equals $P_{TR}(\theta,\lambda/2)$. In this case, the phase history of a target that moves along vector $v_{az}$ 157 relative to the azimuth-coded beam pattern 158 in FIG. 13A is the same as the phase history of a target that moves along vector $v_{el}$ 159 relative to the elevation-coded beam pattern 160 in FIG. 13B, and error coupling is likely to occur between azimuth/elevation estimates and between azimuth-rate/elevation-rate estimates. The phase histories in FIGS. 13A and 13B will be different if different nonlinear phase modulation functions are applied to the array weighting function in the x (azimuth) and y (elevation) directions. One way to obtain different phase modulations in azimuth and elevation is to reverse the sign of the modulation factor γ in Equation (7):

$$p_{trans,az}(x)=p_{rec,az}(x)=\cos^2[\pi x/(2dM)]\exp\{j\gamma\cos^2[\pi x/(2dM)]\}, -dM \leq x \leq dM \quad (32)$$

$$p_{trans,el}(y)=p_{rec,el}(y)=\cos^2[\pi y/(2dM)]\exp\{-j\gamma\cos^2[\pi y/(2dM)]\}, -dM \leq y \leq dM. \quad (33)$$

Figure 13B:
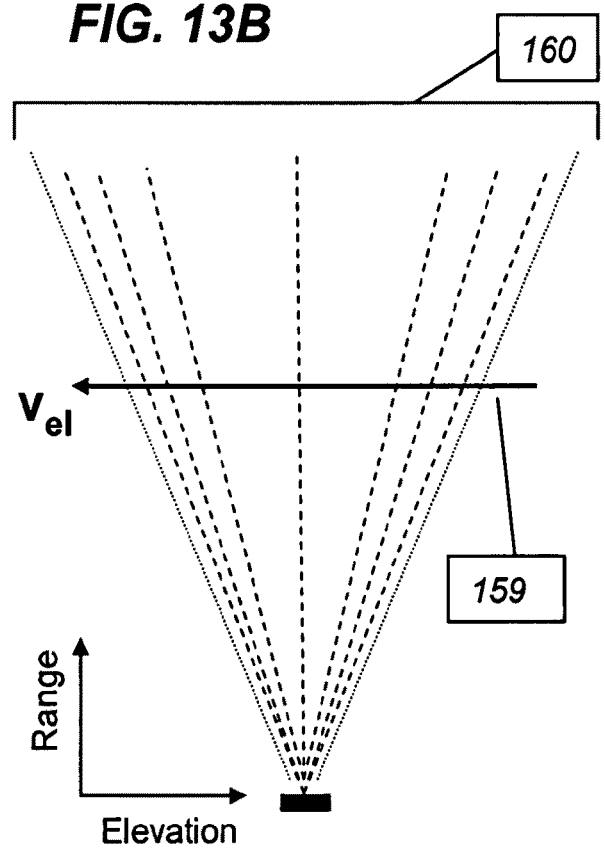
FIG. 13B shows the phase history of a target that moves along vector Vel relative to the elevation-coded beam pattern.
Figure 14A:
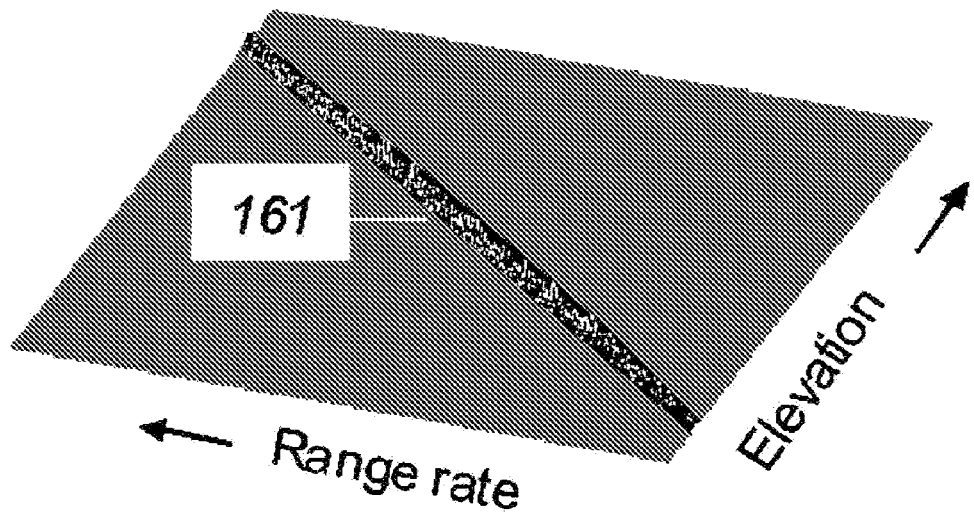
FIG. 14A shows the elevation/range-rate cross ambiguity function.
Figure 14B:
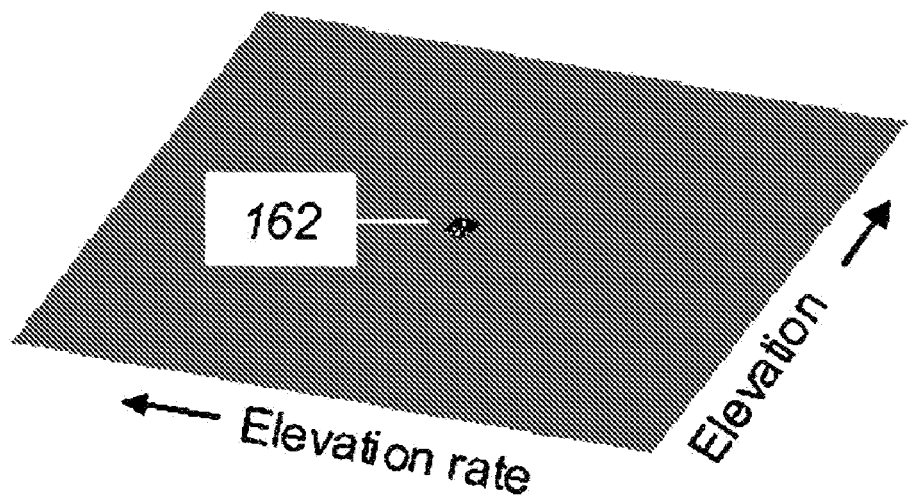
FIG. 14B shows the elevation/elevation-rate cross ambiguity function.

The γ sign reversal is effective if the maximum value of the cross ambiguity function between the two phase histories from FIG. 13A and FIG. 13B is small. The elevation/range-rate cross ambiguity function 161 is shown in FIG. 14A, and the elevation/elevation-rate cross ambiguity function 162 is shown in FIG. 14B, when the data phase history is from FIG. 13A and the reference phase history is from FIG. 13B, and when the array excitation function is described by Equations (32) and (33) with γ=30. In the cross ambiguity functions 161 and 162, the maximum cross ambiguity amplitude is approximately one-tenth of the maximum auto ambiguity amplitude. Two phase histories that are generated as in FIGS. 13A and 13B could be confused (in the absence of noise) if their energies differ by more than a factor of ten.

Improved resolution, ambiguity reduction, and position/velocity parameter estimation (including azimuth rate and elevation rate) are obtained from appropriate phase coding/modulation of the aperture shading function. These characteristics are important for SAR detection of small targets in clutter and for ISAS characterization of flow and turbulence in fluids. In the latter case, flow in a conduit is non-invasively monitored from a stationary array with the beam centerline orthogonal to the vessel. The result is a representation of fluid velocity components parallel and orthogonal to the conduit, as a function of position inside the conduit.

A less obvious application is to resolve many different point scatterers that can be used to measure the average motion (pulse-to-pulse position change) of the target environment relative to the radar/sonar/ultrasound array and/or to measure delay variations caused by a non-homogeneous propagation medium. This capability is important for position/velocity/delay error correction in applications where sensor position varies and is difficult to track to within a small fraction of a wavelength (e.g., sonar systems on underwater platforms), when the average motion of the target environment is difficult to predict (e.g., ISAS applied to ultrasonic analysis of blood flow in the heart), or when the propagation medium is non-homogeneous. In principle, reference targets can be resolved by maximizing the receiver target response with respect to phase history hypotheses that are conditioned on various uncompensated position, motion, or delay errors. The corresponding phase history corrections are then used for detection and parameter estimation of other objects. The invention improves reference target resolution, identification, and phase history estimation by using beam pattern phase modulation to suppress ambiguities and improve estimation/detection performance.

What is claimed is:

1. A synthetic aperture system comprising:
   array elements (110) configured to transmit energy and receive energy;
   a transmitter coupled with said array elements (110) wherein said transmitter comprises
      a second transmit multiplier (113) coupled with said array elements (110);
      a transmit complex factor (115) coupled with said second transmit multiplier (113);
      a first transmit multiplier (112) coupled with said second transmit multiplier (113);
      a transmit complex shading weight (114) coupled with said first transmit multiplier (112);
      a signal generator (111) comprising an output that is coupled with said first transmit multiplier (112) wherein said output is multiplied by said transmit complex shading weight (114) with said first transmit multiplier (112) which is further multiplied by said transmit complex factor (115) with said second transmit multiplier (113) which results in said transmit energy at said array elements (110);
   a receiver coupled with said array elements (110) wherein said receiver comprises
      a first receive multiplier (117) coupled with said array elements (110);
      a receive complex factor (115) coupled with said first receive multiplier (117);
      a second receive multiplier (118) coupled with said first receive multiplier (117);
      a receive complex shading weight (116) coupled with said second receive multiplier (118);
      a sum operator (119) coupled with said second receive multiplier (118) wherein said receive energy from said array elements (110) is multiplied by said receive complex factor (115) with said first receive multiplier (117) which is further multiplied by said receive complex shading weight (116) with said second receive multiplier (118) and summed with said sum operator (119);
   wherein said transmit complex shading weight (114) and said receive complex shading weight (116) are configured to nonlinear phase variation as an observer moves across the transmit energy in one or more direction and wherein said nonlinear phase variation is independent of element phase shifts utilized to steer a beam and independent of phase corrections necessitated by a non-homogeneous propagation environment.

2. The synthetic aperture system of claim 1 further comprising:

a target phase history model that incorporates beam-induced phase modulation in addition to quadratic phase variation caused by range changes as a beam pattern associated with said transmit energy is moved across a target or the target is moved across the beam pattern, and that incorporate unknown or hypothesized azimuth, range rate, and azimuth rate parameters when relative motion between said array elements (110) and a target environment is only in an azimuth direction, and that includes hypothesized elevation and elevation rate parameters when the relative motion is in both the azimuth direction and an elevation direction.

3. The synthetic aperture system of claim 2 further comprising:

a generalized synthetic aperture map created through correlation of echo data with the target phase history model wherein said generalized synthetic aperture map represents target strength as a function of a range, an azimuth, the range rate, and the azimuth rate for the relative motion in the azimuth direction, and that represents a target strength as a function of the range, azimuth, elevation, range rate, azimuth rate and elevation rate for the relative motion in both the azimuth and elevation directions.

4. The synthetic aperture system of claim 1 wherein a relative motion between the array elements (110) and a target environment is in one dimension, and the transmit complex shading weight (114) in an azimuth direction has Hann, half-wave, squared-cosine amplitude and phase modulation $$p_{trans,az}(x) = \cos^2[\pi x/(2dM)]\exp\{j\gamma \cos^2[\pi x/(2dM)]\}, -dM \leq x \leq dM$$

where d is an element spacing, and a planar, rectangular array contains 2M−1 rows of elements with nonzero weighting in an x-direction, $\gamma$ is a phase modulation factor with absolute value less than or equal to 2M, and wherein the transmit complex shading weight (114) equals the receive complex shading weight (116) and wherein the transmit complex shading weight (114) in azimuth and elevation is $$p_{trans}(x,y) = p_{trans,az}(x)p_{trans,el}(y)$$

where $p_{trans,el}(y)$ is a smooth shading function without nonlinear phase modulation $$p_{trans,el}(y) = \cos^2[\pi y/(2dN)], -dN \leq y \leq dN.$$

5. The synthetic aperture system of claim 1 wherein a relative motion between the array elements (110) and a target environment is in two dimensions, and the transmit complex shading weight (114) in an azimuth and elevation direction is $$p_{trans}(x,y) = p_{trans,az}(x)p_{trans,el}(y)$$

for a planar, rectangular array, where $$p_{trans,az}(x) = \cos^2[\pi x/(2dM)]\exp\{j\gamma \cos^2[\pi x/(2dM)]\}, -dM \leq x \leq dM$$

and $$p_{trans,el}(y) = \cos^2[\pi y/(2dM)]\exp\{-j\gamma \cos^2[\pi y/(2dM)]\}, -dM \leq y \leq dM$$

and wherein the transmit complex shading weight (114) equals the receive complex shading weight (116) and wherein the element spacing of the array elements (110) is d in both x and y directions, and array dimensions of the array elements (110) are (2M−1)×(2M−1) when only elements with nonzero weights are considered and wherein the phase modulation factor $\gamma$ has absolute value less than or equal to 2M.

* * * * *